US012380484B1

(12) United States Patent
Chaturvedi et al.

(10) Patent No.: US 12,380,484 B1
(45) Date of Patent: Aug. 5, 2025

(54) CONTEXTUALLY RELEVANT USER-BASED PRODUCT RECOMMENDATIONS BASED ON SCENE INFORMATION

(71) Applicant: Amazon Technologies, Inc., Seattle, WA (US)

(72) Inventors: Yash Chaturvedi, Issaquah, WA (US); Mohamed Kamal Omar, Seattle, WA (US); Alexander Ratnikov, Redmond, WA (US); Ahmed Aly Saad Ahmed, Bothell, WA (US); Steven James Cox, Mill Creek, WA (US); Prasanth Saraswatula, Bellevue, WA (US); Jingxiang Chen, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 675 days.

(21) Appl. No.: 17/385,406

(22) Filed: Jul. 26, 2021

(51) Int. Cl.
  *G06Q 30/00* (2023.01)
  *G06N 20/00* (2019.01)
  *G06Q 30/0601* (2023.01)

(52) U.S. Cl.
  CPC ......... *G06Q 30/0631* (2013.01); *G06N 20/00* (2019.01)

(58) Field of Classification Search
  CPC .................. G06Q 30/0631; G06N 20/00
  USPC ............................... 705/26.1–27.2
  See application file for complete search history.

(56) References Cited

U.S. PATENT DOCUMENTS

2019/0287139 A1* 9/2019 Yadav .................. G11B 27/034
2019/0362154 A1* 11/2019 Moore ................. G06V 10/764

OTHER PUBLICATIONS

Gharibshah, Zhabiz, et al., "User Response Prediction in Online Advertising". ACM Computing Surveys (CSUR), 2021, preprint. https://doi.org/10.48550/arXiv.2101.02342 (Year: 2021).*

* cited by examiner

Primary Examiner — Anand Loharikar
(74) Attorney, Agent, or Firm — EVERSHEDS SUTHERLAND (US) LLP

(57) ABSTRACT

Systems, devices, and methods are provided for determining contextually relevant user-based product recommendations based on scene information. In at least one embodiment, techniques described herein may be used to determine, using a first machine-learning model, first information associated with a first object within a first image of digital content, determine, using a second machine-learning model, similarity scores between the first object and a first plurality of products of an online purchasing system, detect, in association with the first image of the digital content, performance of a first computer-based action by a user, determine, using a third machine-learning model and based on contextual data of the user, one or more affinity scores for the user, select a first product based on the one or more affinity scores, and present a recommendation to the user to perform a second computer-based action in association with the first product.

16 Claims, 10 Drawing Sheets

CONTEXTUALLY RELEVANT USER-BASED PRODUCT RECOMMENDATIONS BASED ON SCENE INFORMATION

BACKGROUND

In many cases, viewers of a video stream (e.g., on a television) may wish to learn more about various objects that appear in a scene of the video stream. Currently, there may be many difficulties that impede the ability of a viewer of a video stream to learn more about the content that the viewer is watching. Among these challenges includes the vast amount of information that may be included in a scene, which may include several persons, foreground objects, background objects, and more. Providing information regarding hundreds of different persons and objects from a scene may present a form of information overload and provide an undesirable viewing experience. Another challenge may involve determining what type of information to provide, as different viewers may have different preferences and interests that make the presentation of information relating to some objects relevant for a first viewer but may be inappropriate for other users.

Figure 1:
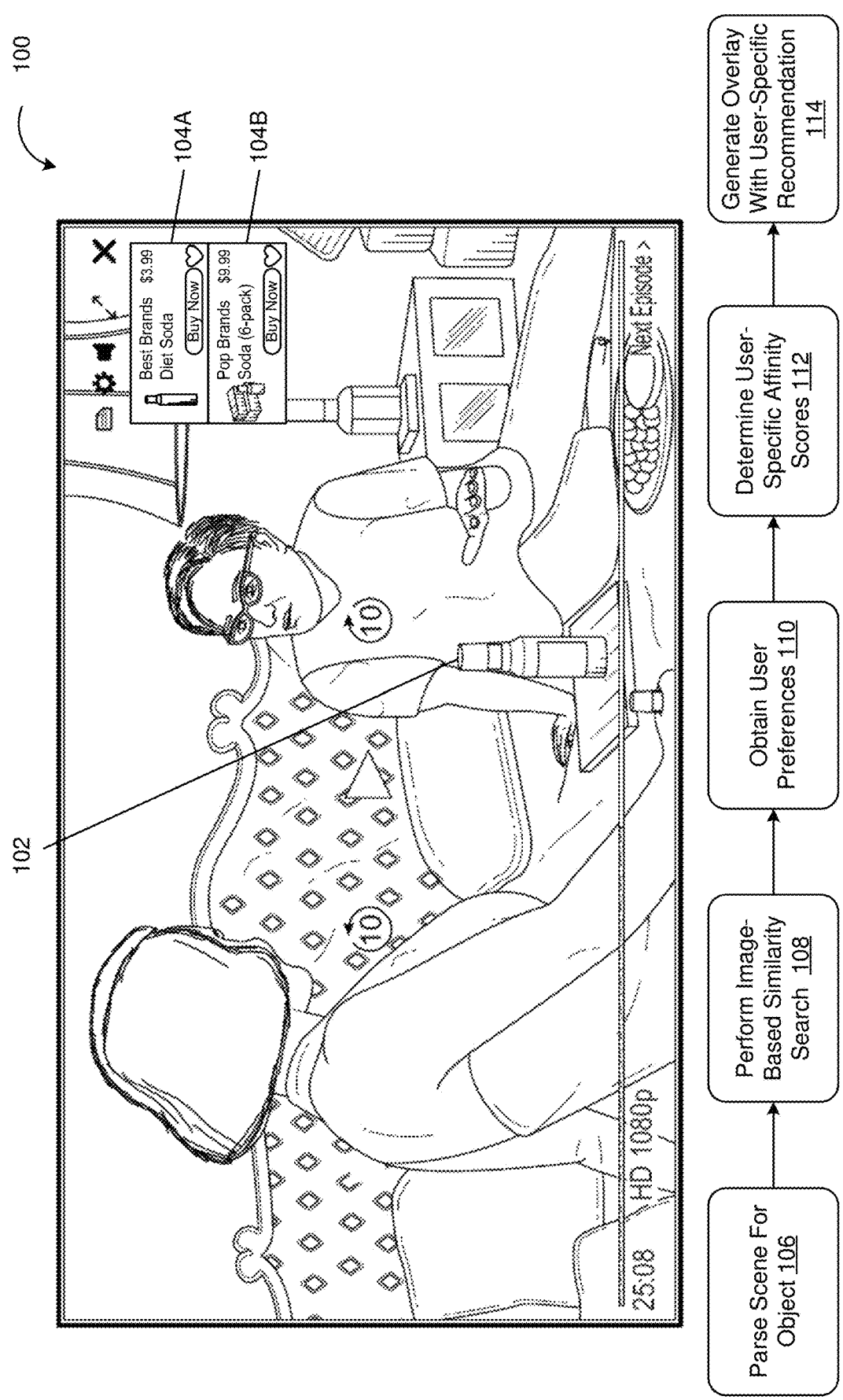
FIG. 1 illustrates an example use case for user-specific product recommendations is depicted in accordance with one or more example embodiments of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

This disclosure relates to, among other things, systems, methods, computer-readable media, techniques, and methodologies for generating personalized recommendations for users based on content displayed in a video stream that is relevant to tastes or preferences of a user and/or that is contextually relevant to a current, historical, or future use context of a user device such as a television, smartphone, media playback device, etc., and transmitting the personalized recommendation content to a user device for visual presentation. The recommendation content may be presented to the user as part of or as part of an overlay of a video stream so that the user is able to interact with the recommendations without requiring the user to open a separate application or perform other obtrusive operations that may distract with the user's viewing experience.

In at least one embodiment, and as described in greater detail below, personalized recommendations may be generated for users of a video stream, who may also be referred to herein as "viewers." A video stream may present visual and/or audio content to a user in a sequence of frames at a fixed or variable rate. A viewer of a video stream may pause a video stream with an intention to learn more about what is happening in a scene. For example, the viewer may wish to pause a video stream to have a better view onto certain objects that are being displayed in the scene, to learn more about the said objects, to discover more information related to said object, and more.

Video streams may be analyzed to generate user-specific recommendations based on contextual scene information. A computer vision or machine-learning model is used to analyze image frames of a video stream to perform object detection. As part of the object detection algorithm, metadata about the object may be determined, such as the x- and y-coordinates of the detected objects, the size of a bounding box that approximately represents a region or patch of the image that the object occupies. In some cases, object detection may also include coarse-grained information about what object was detected, such as a bicycle, a dress, a bottle, but not more granular information such as whether the bike is a mountain bike or sports bike, whether the dress is a full-length dress or mini-skirt, the brand of a beverage bottle, etc. A convolutional neural network for object detection may be implemented using a convolution neural network such as Region based CNN, Fast-RCNN, Faster-RCNN, Faster-RCNN with FPN, and more.

One or more patches may be identified in an image frame, corresponding to one or more respective objects that are detected within the image frame. Patches may be rectangular regions of an image frame, or any other suitable shape. A patch may comprise a plurality of pixels and be used to perform an image-based similarity search to identify similar items in a database. In some cases, additional metadata is provided along with the pixels, such as a coarse category of the type of content included in the patch, which may be used to optimize or filter a database search so as to make the search faster by excluding unrelated items from the search.

An image-based similarity search may receive, as an input, visual data (e.g., patch of an image frame) and compare the similarity of the input visual data against a database of images or other types of visual data. The database may, for example, be a product database of various items for an online purchasing system. A computer-based purchasing system may include one or more network-accessible resources associated with a purchasing system, such as a web-based purchasing system or a mobile application-based purchasing system. The determination of an affinity score may correspond to a value assigned to how likely a user is to perform a computer-based action. Actions may include purchasing an item, signing up for a subscription, enabling a shopping experience such as one-click purchasing or purchasing through voice commands, and more.

In various embodiments, a database of an online purchasing system comprises records for various products. A record for a product may include metadata regarding the product, such as a product name, short description, long description, product category, reviews, images of the product, and so on. An image-based similarity search engine may compare an input image (e.g., patch corresponding to a detected object) and compare the input against product images in the database using a machine-learning model. The machine-learning model may compare two images using a K nearest neighbor (K-NN) classification model to determine a similarity score between the two images. The similarity score may be scaled from 0 to 1, with 0 indicating a high degree of dissimilarity and 1 indicating a very high similarity between the images being compared. In some cases, the similarity score is a value between 0 and a maximum value such as 100.

As a result of performing an image-based similarity search, similar products to an image may be identified, and a list of the N most similar items may be returned as search results. The search results may be ordered (e.g., ranked) in descending order, with the most similar item appearing as the result with the highest ordinal. In some cases, multiple searches are performed on a detected object over a sequence of frames to obtain multiple result lists, which are aggregated to provide for more stable and accurate search results. For example, if an object is detected and tracked over 750 frames of a video segment (e.g., approximately thirty seconds), various embodiments may select two tracked frames (e.g., those that are most clear, subject to the least motion or blurring, etc.) of the object from two different angles and submit patches from those frames for image-based similarity searches. Performing searches at different angles or perspectives may yield better search results. Search results for the object from the first angle may be returned (e.g., first list of the 50 most similar items from the first angle) and results from the second angle may be returned (e.g., second list of the 50 most similar items from the second angle). Each result entry may have a product identifier and a similarity score. The two lists may be aggregated—for example, if an item appears in both results, the aggregated score may be the sum or average of the individual similarity scores. The aggregated results may be tabulated to determine a final list of similar items. The video stream may be annotated with information regarding detected objects and/or similar items. For example, a video stream may be annotated with information indicating that a suitcase was visible from 25:30-25:40 of the video and a list of the most similar items to that suitcase found in the database of the online purchasing system. The annotations may be stored in a database table, structured storage, or any suitable manner of storage.

Accordingly, scenes of video streams may be parsed for objects. For detected objects, image-based similarity searches may be performed on the objects, and the accuracy of such searches may be improved by selecting frames of an object from different perspectives so as to identify objects that are also similar from the different perspectives. The image-based similarity search may be performed against a product database of an online purchasing system. Results of the image-based similarity search may be encoded as annotations to the video stream. Annotations may encode when an object was visible within the video stream and a list of visually similar items from the image-based similarity search. The list of similar items may be used to generate user-specific product recommendations, furthermore based on user-specific preferences such as spending history, budget, semantic processing of user reviews, what they personally like based on viewing history, etc.

User-specific affinity scores may be generated in response to users performing various computer-based actions to interact with a video stream. For example, a user may pause the video stream using a remote control device, issue a voice-based command to control a display device integrated into a television set, and more. Affinity scores may refer to values that are determined as the likelihood or propensity of a user to perform a specific action, such as making a purchase, interacting with a graphical object, and more. Affinity scores may be generated for a user to identify a set of product recommendations to present. Several objects may be detected in a scene, and recommendations may be personalized to a user's taste/preferences. For example, if a scene includes various objects such as luggage suitcases and dresses, a first user that expresses a taste or preference for travel may be shown recommendations for suitcases similar to what was shown in the video stream. Conversely, a second user that expresses interest in fashion and has purchase and/or viewing history for dresses may be presented with recommendations for dresses similar to what was shown in the video stream.

A user's tastes/preferences may be determined based on various information available to a system. Customer contextual data may include, for example, search/browsing history data indicating previous search or browsing activity of the user, purchase history data indicating previous items/services purchased by the user, content consumption data indicating previous content consumed on the user device or other device(s), reviews or other content created by the customer, and so forth. Customer contextual data may be used to refine product recommendations and tailor to match a user's preferences/tastes. For example, a user's budget, previous shopping history, browsing history, wish list, current or past shopping cart, etc. may be used to refine product recommendations. Continuing with this example, if a customer's previous shopping history and budget indicates that the customer prefers to spend no more than $200 on clothing, the list of dresses similar to a dress displayed in the scene of a video stream may be filtered. For example, the filter may remove ball gowns that are over $1,000 due to the large price differece and reduced likelihood that a user would interact with such items. Items that are too expensive, sold out, discontinued, etc. may be filtered out or have their affinity scores reduced based on a user's tastes/preferences. Items within a specific range of a customer's budget may be included. For example, for a given budget B, a multiplier N where N>1 (e.g., N=1.25) may be used to create a maximum price filter of B*N to present the customer with some items that exceed their budget, but may nevertheless be relevant or that the customer is likely to action on or engage with.

A user's engagement within or otherwise related to an online purchasing platform may be used to determine more accurate affinity scores. It may be the case that a user that writes positive reviews for previous purchases for a product category or brand is more likely to perform computer-based actions for similar types of items. Accordingly, if a user has written favorable reviews for travel-related items such as travel-sized toiletry bags or travel-sized items, the user may be more likely to engage with product recommendations for luggage suitcases. User engagement may take many forms—for example, a user may express engagement by writing reviews, creating videos or other digital content related to certain products, subscriptions, or experiences, browsing/searching for specific products, brands, or categories, and so forth.

Natural language processing (NLP) techniques may be used to parse text and other free-form content that a user may generate. In contrast to discrete or closed-form content, such as a user's browsing history or ranking an item from 1 to 5 stars, reviews may be open-ended in nature and it may be difficult to determine how a text-based review that a user writes with both positive and negative points regarding a product affects a user's affinity to products. For example, a user may write a glowing recommendation for a travel-sized toiletry bag, but also write that they regret the purchase because they have less time to travel now. One or more NLP engines may be used to parse the user's reviews to determine whether a user's affinity score should be increased or reduced based on the information provided by the user. NLP engines may be trained using a Bidirectional Encoder Representations from Transformers (BERT) model for pre-trained language representations to create models for the tasks of Natural Language Processing and extract high-quality language functionality from text-based data.

User-specific affinity scores may be computed when a video stream is paused. When a user pauses a video stream, annotations for the scene may be retrieved from a database to identify various objects that may be included in the scene and similar products that may be available on an online purchasing system. A user-specific affinity score may be generated for some or all of the similar products based on customer contextual data including, for example, search/browsing history data indicating previous search or browsing activity of the user, purchase history data indicating previous items/services purchased by the user, content consumption data indicating previous content consumed on the user device or other device(s), reviews or other content created by the customer, and so forth. The affinity score for a similar product may increase based on customer contextual data indicating that a particular customer will likely engage with the product. Affinity scores may be generated for a set of similar, ranked according in descending order, and one or more products may be presented to the user graphically.

Product recommendations may be placed within a region of the video stream as an overlay to allow for the user to see products of an online purchasing system that are similar to objects that the user sees within the scene of the video stream. For example, if a scene depicts two people talking together with a beverage bottle featured prominently in front of them, a product recommendation may be generated for similar beverage products and displayed in an unobtrusive manner when the video stream is paused. The product recommendation may include various graphical and text-based information, such as a picture of the product, product name, short description, long description, price, and various computer-based actions that the user may take. Computer-based actions may include options to Favorite or Like the item, save the item to a shopping cart or wish list, purchase the item, learn more about the item, and so forth.

Referring to FIG. 1, an example use case 100 for user-specific product recommendations is depicted in accordance with one or more example embodiments of the disclosure. In FIG. 1, at a user may pause a video stream on a frame that depicts various objects including two persons, a beverage bottle, a lamp, headboard, nightstand, and so forth. Objects in the scene such as the beverage bottle identified as numeral 102 may be detected and used to determine product recommendations. For example, first product recommendation may be for a first product based on a first affinity score and second product recommendation may be for a second product based on a second affinity score. A first graphical user interface (GUI)-based overlay 104A may be generated for the first product recommendation and a second GUI-based overlay 104B may be generated for a second product recommendation.

In at least one embodiment, FIG. 1 depicts a video stream that a user may watch and interact with by performing computer-based actions. The video stream may be presented to a user via a television, smartphone, tablet, laptop, etc. The presentation of digital content (e.g., video stream) on a display device integrated into the television set can be controlled using a remote-control device, for example. The remote-control device can be functionally coupled to the computing device via wireless links, for example. The remote-control device can include, in some embodiments, a keypad having keys corresponding to respective operations. An end-user can control the presentation of digital content on the display device by actuating a button in the keypad. In some embodiments, the remote-control device can include another type of control interface besides a keypad. That control interface can be configured to receive user input (e.g., a touch, a swipe, a gesture, voice command, or similar) identifying a desired operation that controls presentation of the digital content and/or operation of the television set. The remote-control device need not be a dedicated device. In some embodiments, the remote-control device can be user activity comprises an interaction with a wireless device (e.g., a smartphone, a tablet computer, or similar) configured to control presentation of the digital content on the display device. For instance, the wireless device can include a software application or other type of program code that permits controlling the presentation of digital content.

In accordance with one or more example embodiments of the present disclosure, a multimedia service serves multimedia content, such as a video stream, to a user. The video stream may be encoded according to an AVC (Advanced Video Coding) video compression standard such as H.264. The video stream may be received by a user and presented visually to the user on a graphics display device, such as a monitor, touchscreen, television, etc.

A user may control playback of the multimedia content by playing, fast forwarding, rewinding, pausing, or other various playback commands. Playback commands may be issued by a user for any of a variety of reasons. For example, in some cases, a user may pause a video or rewind a video in order to have a better view of the content that was displayed over a video segment. This may be referred to as a segment of interest.

Regardless of the particular type of control interface, the remote-control device can send a control signal to the computing device in response to an operation selected on the remote-control device. The operation can include, for example, power on, power off, volume up, volume down, pause, trick play, or similar. The control signal can thus represent user activity and can constitute a presence signal indicative of presence of an end-user near the television set.

A control signal may indicate that a user has paused the video stream at a particular point in time. As depicted in FIG. 1, a video may be paused at 25:08 or another time based on a user action (e.g., using a remote-control device). In various embodiments, a computer system performs techniques for generating user-specific affinity scores to provide customized product recommendations to a user that are contextually relevant and based on what the user is watching.

When a user pauses a video, various techniques described herein may be used to generate product recommendations based on scene analysis and image similar analysis. For example, when a user pauses a scene, the scene may be parsed to understand contextual information relating to the scene, including but not limited to detecting objects in the scene. Machine-learning techniques, such as convolutional neural network (CNN)-based models may be used to implement computer vision techniques for object detection. A scene may include several objects. For example, a movie scene depicting two actors in a diner may include several objects including but not limited to the actors; the actors' clothes; a table, lights, and other fixtures depicted in the scene; plates, utensils, and other tableware; food items, such as beverage bottles, condiments; and more. A machine-learning model may parse a scene to extract objects from the scene, determine which objects in a scene are most contextually relevant, perform one or more image-based product searches on the extracted objects, and determine contextually relevant product recommendations that may be presented visually to the user.

A graphical user interface may be used to present contextually relevant product recommendations for a user in response to a user action. The user action may refer to a user issuing a playback command, such as pausing a video, or a sequence of actions that indicates that a segment may be of interest, such as pausing a video, rewinding, and re-playing a particular clip. In some cases, the user action may be an audio command that the user issues via speech.

In various embodiments, when a computer system receives or otherwise detects that a video stream has been paused, the computer system may initiate workflow such as 106-114 or a portion thereof to generate user-specific contextual product recommendations. Contextual relevance may be based on the scene of the digital content that the user is watching.

A system may parse a scene for objects 106. In various embodiments, a computer-vision or machine-learning model is used to parse a scene for objects. Parsing a scene for objects may involve the performance of object detect, object identification, object tracking, and so forth. Combinations of techniques may be used—for example, an object may be detected at a first frame and tracked over a sequence of frames. From the sequence of frames tracking the same object, one or more key frames may be selected to perform image-based similarity search. The selection of these key frames may be based on various factors, such as whether the object is occluded, whether the object is in motion or subject to blurring, lighting effects, and more. In some cases, an object is shown from different angles or perspectives over a sequence of frames, and key frames may be selected from multiple angles to provide for more accurate search results. Objects may be parsed from a scene asynchronously from a user viewing a video stream. For example, a video stream may be analyzed for objects as part of a background process or workflow that is independent of user viewing of digital content.

Objects may be detected and categorized using a convolutional neural network such as Faster R-CNN. Machine-learning models may be trained on various data sets such as a LVIS dataset for large vocabulary instance segmentation. In some embodiments, object detection machine-learning models infer a bounding box around objects and provide a coarse-grained categorization of the object. A small number of categories (e.g., on the order of hundreds or thousands of categories) may be available. For example, a coarse-grained category may be for "bicycle" or "bottle" but not more specific as to whether the bicycle is a mountain bike or a tricycle. In various embodiments, the machine-learning model for object detection may be configurable via parameters such as a maximum number of objects to detect in a scene. In various embodiments, a region of an image frame that is detected as being an object is extracted as a patch, which may be used to perform image-based similarity searches to find products that are similar to the object in the scene.

In various embodiments, a system performs a step to perform image-based similarity search 108. For an object detected in a frame of a video stream, a patch of the frame corresponding to the detected object may be provided as an input to perform an image-based similarity search. The search may be performed using a neural network. For example, a frame patch may be used to generate a set of embeddings that provided as an input into a K nearest neighbor (K-NN) classification model or other suitable machine-learning model. Likewise, embeddings may be determined for images in a product database of an online purchasing system. The embeddings extracted from the patch corresponding to an object in a video stream may be compared against the embeddings extracted from the product images to determine a similarity score. The similarity score may be determined using a K-NN classification model with cosine similarity or cosine distance. The similarity score may be scaled from 0 to 1, with 0 indicating a high degree of dissimilarity and 1 indicating a very high similarity between the images being compared. In some cases, the similarity score is a value between 0 and a maximum value such as 100.

An image-based similarity search may be performed using a K-NN classification model with cosine similarity, or other suitable neural networks. An example backbone network is ResNet-50, although other neural networks may also be used. The neural network may be pretrained from a database of images, such as the ImageNet database. The similarity metric may be cosine distance or cosine similarity, and K-NN may be the search model. Machine-learning models may be trained using linear regression, logistic regression, Ridge regression, Lasso regression, elastic net (EN) regression, support vector machine (SVM), gradient boosted machine (GBM), K nearest neighbors (K-NN), generalized linear model (GLM), and combinations thereof.

Accordingly, a product database may be searched for products that are similar to the object depicted throughout a video stream. Lists of similar objects may be returned as an output of an image-based similarity search. The list may be of a fixed size, may return products that exceed a certain threshold value, and so forth. As a result of performing an image-based similarity search, similar products to an image may be identified, and a list of the N most similar items may be returned as search results. The search results may be ordered (e.g., ranked) in descending order, with the most similar item appearing as the result with the highest ordinal. In some cases, multiple searches are performed on a detected object over a sequence of frames to obtain multiple result lists, which are aggregated to provide for more stable and accurate search results. For example, if an object is detected and tracked over 750 frames of a video segment (e.g., approximately thirty seconds), various embodiments may select two tracked frames (e.g., those that are most clear, subject to the least motion or blurring, etc.) of the object from two different angles and submit patches from those frames for image-based similarity searches. Performing searches at different angles or perspectives may yield better search results. Search results for the object from the first angle may be returned (e.g., first list of the 50 most similar items from the first angle) and results from the second angle may be returned (e.g., second list of the 50 most similar items from the second angle). Each result entry may have a product identifier and a similarity score. The two lists may be aggregated—for example, if an item appears in both results, the aggregated score may be the sum or average of the individual similarity scores. The aggregated results may be tabulated to determine a final list of similar items. The video stream may be annotated with information regarding detected objects and/or similar items. For example, a video stream may be annotated with information indicating that a suitcase was visible from 25:30-25:40 of the video and a list of the most similar items to that suitcase found in the database of the online purchasing system. The annotations may be stored in a database table, structured storage, or any suitable manner of storage.

Image-based similarity searches for a video stream may be performed asynchronously or independently of object detection. As products available through an online purchasing system generally change over time, image-based similarity searches can be performed on a periodic basis to ensure that the similar products being cached are indeed still available through the online purchasing system. For example, new products may be added, existing products may be discontinued, additional images may be added for existing products, etc. that may influence the results of an image-based similarity search.

In various embodiments, when a user pauses a video stream, user-specific recommendations may be generated. The recommendations may be contextually relevant to the paused scene being displayed in the video stream. A system may obtain user preferences 110. A user's tastes/preferences may be determined based on various information available to a system. Customer contextual data may include, for example, search/browsing history data indicating previous search or browsing activity of the user, purchase history data indicating previous items/services purchased by the user, content consumption data indicating previous content consumed on the user device or other device(s), reviews or other content created by the customer, and so forth. Customer contextual data may be used to refine product recommendations and tailor to match a user's preferences/tastes. For example, a user's budget or previous shopping history may be used to refine product recommendations. Textual data, such as reviews and comments that the user has posted on an online purchasing system or other systems (e.g., social media accounts, forums, bulletin board systems, etc. that are linked to the online purchasing system) may be parsed using a NLP engine to determine embeddings or other metadata to improve the accurate affinity scores.

In at least one embodiment, a system determines user-specific affinity scores 112. User-specific affinity scores may be assigned to one or more similar products depicted in the scene. For example, FIG. 1 depicts a scene with an object 102 (e.g., beverage bottle) and an image-based similarity search may determine that there are three similar items- "Best Brands Diet Soda"; "Pop Brands Soda (6-pack)"; and "Best Brands Iced Tea". These products may have precomputed similarity scores comparing the products to the beverage bottle depicted in the paused scene. For example, the scores may be, respectively, 0.79, 0.85, and 0.90 on a scale of 0 to 1, with 1 being the highest degree of similarity. A neural network or machine-learning model may be used in a third phase to generate recommendations for similar products based on a user or customer's tastes, preferences, topics of interest, etc. The machine-learning model may be initialized to have affinity scores that correspond to the similarity scores and then trained to infer click-through rates based on customer contextual data such as search/browsing history data indicating previous search or browsing activity of the user, purchase history data indicating previous items/services purchased by the user, content consumption data indicating previous content consumed on the user device or other device(s), reviews or other content created by the customer, and so forth. In some cases, user-specific affinity scores are determined based on customer contextual data to the exclusion of the similarity scores.

As an example, a neural network or other suitable machine-learning model may analyze customer contextual data such as reviews and determine that the user has written reviews on various iced tea products and has expressed a distaste for iced tea. Accordingly, the user's affinity score for "Best Brands Iced Tea" may be decreased based on such customer contextual data. In this way, and as an illustrative example, a highly similar product to an object detected on screen may be downgraded such that it is not shown as an overlay even though it has a higher similarity score than other products. As seen in FIG. 1 and described above, product recommendations for "Best Brands Diet Soda" and "Pop Brands Soda (6-pack)" are shown in overlays 104A and 104B even though they have lower similarity scores to object 102 than "Best Brands Iced Tea"—this may be because the user's preferences/tastes disfavor iced tea products. The particular user's affinity score for such products may therefore be lowered, relative to other beverage products.

Natural language processing (NLP) techniques may be used to parse text and other free-form content that a user may generate. In contrast to discrete or closed-form content, such as a user's browsing history or ranking an item from 1 to 5 stars, reviews may be open-ended in nature and it may be difficult to determine how a text-based review that a user writes with both positive and negative points regarding a product affects a user's affinity to products. For example, a user may write a glowing recommendation for a travel-sized toiletry bag, but also write that they regret the purchase because they have less time to travel now. One or more NLP engines may be used to parse the user's reviews to determine whether a user's affinity score should be increased or reduced based on the information provided by the user. NLP engines may be trained using a Bidirectional Encoder Representations from Transformers (BERT) model for pre-trained language representations to create models for the tasks of Natural Language Processing and extract high-quality language functionality from text-based data.

In various embodiments, a user's budget is used to determine a user-specific affinity score. If a customer's previous shopping history and budget indicates that the customer prefers to spend no more than $200 on clothing, the user-specific affinity score for similar products may be adjusted based on the user's spending habits, budget, or other information that may indicate that the user is more or less likely to purchase the similar item. For example, the most similar product to an on-screen object may be a ball gown that is over $1,000. However, the customer may have a budget set to $200 or has a shopping history of not spending more than $200 on dresses. A machine-learning model may be trained to infer click-through conversion rate for similar items based on customer contextual data indicating their tastes/preferences. For example, the machine-learning model may be trained to extract various embeddings from customer contextual data such as budget and/or spending history that indicate the user is unlikely to perform a computer-based action on products that are significantly higher in price than a user's budget or spending habits. Computer-based actions that a machine-learning may be trained to infer may include the rate at which a user is predicted to click-through, like, add to cart, buy now, etc., a product based on the user's tastes/preferences.

A system may generate one or more overlays with user-specific recommendations 114. An overlay region may be selected, computed, or otherwise determined. One or more overlays may be generated in the overlay region. The overlay region may include a plurality of overlays for products having equal size and shape. In some cases, overlays for products that have a higher affinity score or are being promoted may be larger in size or featured more prominently. In some cases, overlays may be a rotating display wherein a first product is shown, and then replaced with a second product after a period of time has elapsed, and so forth. Overlays may be generated for the similar products with the highest user-specific affinity scores. For example, a machine-learning model may determine customer-specific affinity scores for a list of similar products to object 102 based on customer contextual data and select items based on the affinity scores. In some cases, items are sorted by affinity score and the items with the highest user-specific affinity score are displayed in the overlays. However, such need not be the case—in some embodiments, the affinity scores are given weights such that products with higher user-specific affinity scores are probabilistically shown more frequently than products with lower user-specific affinity scores. Such a probabilistic display model may provide users with greater discovery of various similar products, rather than always showing the same similar items.

While FIG. 1 illustrates an example graphical user interface in which product recommendations may be generated, it should be taken as a non-limiting illustrative example. Product recommendations may be generated in other graphical user interfaces. For example, when a user selects a show or movie to watch, the user may be presented with a preview or landing page. The preview or landing page may comprise information such as the content's title, the length of the content, a list of actors, etc. In some embodiments, product recommendations may be displayed in a preview or landing page by analyzing the digital content to determine a list of object that appeared throughout the content and generating user-specific affinity scores for products associated with some or all of the objects that appeared in the digital content. Product recommendations may be ranked based on various criteria, such as how long objects were present in the digital content. For example, there may be a minimum threshold for how long objects appeared in digital content to be considered a candidate object. Candidate objects may be identified and used to identify similar products of an online purchasing system. User-specific affinity scores may be calculated for the products, ranked according to the computed scores, and then presented based on their rankings.

Figure 2:
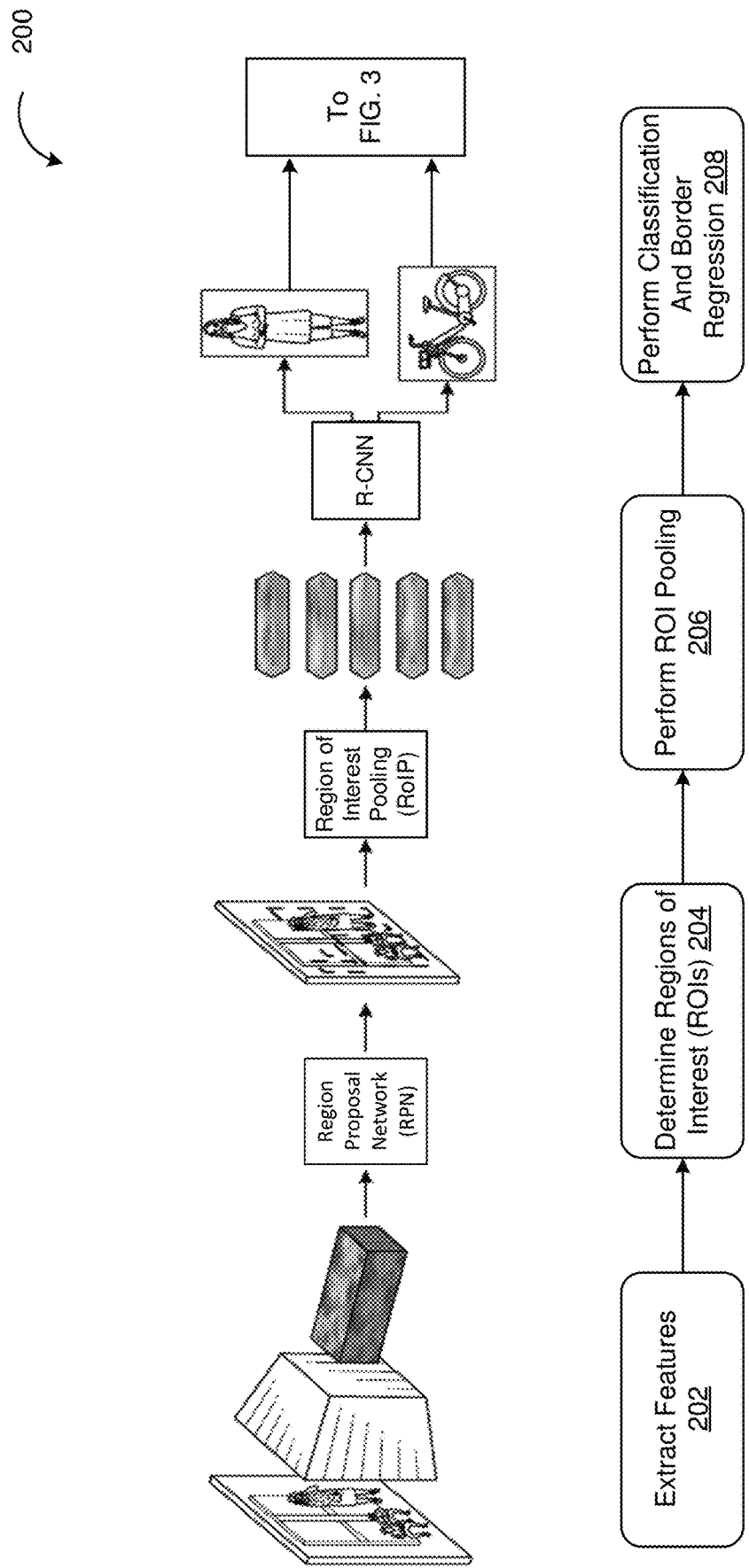
FIG. 2 depicts a diagram of a first phase for generating user-specific recommendations based on contextual information from a scene of a video stream, in accordance with one or more example embodiments of the disclosure.

FIG. 2 depicts a diagram 200 of a first phase for generating user-specific recommendations based on contextual information from a scene of a video stream, in accordance with one or more example embodiments of the disclosure. In various embodiments, workflow 202-208 may be used to perform object detection within digital content such as a video stream. Object detection may be performed asynchronously of other phrases, such as second phase for image-based similarity search against a product database of an online purchasing system and/or third phase for generating user-based product recommendations that are contextually relevant to a scene of the video stream that is being viewed by the user.

FIG. 2 depicts a system that extract features 202 from an image using a convolutional neural network such as VGG16, ZF-Net, and others. A training data set such as ImageNet may be used to train the convolutional neural network. The convolutional neural network may be used to receive a still frame or image of a video stream as an input to extract a feature map. The feature map may be the results produced by CONV5 of a VGG16 backbone, or other suitable convolutional neural network. The feature map may be provided as an input to a region proposal network (RPN). In various embodiments, feature extraction network (e.g., VGG-based convolutional neural network) is used to extract features of different targets. The feature extraction network may comprise CONV, RELU, and POOL layers.

In various embodiments, a region proposal network is used to determine regions of interest (ROIs) 204. A RPN may, as depicted in FIG. 2, receive an input feature map and provide one or more candidate boxes as outputs that correspond to candidate regions of interest. In the RPN phase, foreground and background elements of the image may be distinguished. The RPN network may be used to distinguish and initially locate multiple ROIs generated by the feature map. The RPN may generate one or more regions of interest at points of the feature map and use a classifier to distinguish the ROIs as being background or foreground. Regression techniques may be used to refine the positions of a ROI. A region proposal network is implemented as a fully convolutional network (FCN) according to at least one embodiment. A feature map may be received as an input to the RPN and predict the size and location of candidate boxes.

In various embodiments, a system performs ROI pooling 206. In various cases, RPN provides several candidate boxes corresponding to different regions of an image. These given areas are sent to the next classification stage for ROI pooling. RoIP may be used to extract a fixed size feature map for each candidate. For example, each candidate may be cropped and fed into a pre-trained base network to extract features and then train a classifier. Faster R-CNN may be used to accelerate computational efficiency by reusing CONV feature maps. For example, RoIP may be used to extract fixed-size feature maps for each proposal and R-CNN is for fixed-size features.

ROI Pooling may be used to generate a feature map of a specific size through the use of maximum pooling operation for subsequent classification and bounding box regression operations. In ROI Pooling, the boundary of a candidate box may be quantized to integer point coordinate values and divided into units of a fixed size to avoid regional mismatching. For example, a 20×20 feature map may need to be mapped to a smaller final feature map size 7×7.

In various embodiments, a system performs classification and border regression 208 using the final feature map generated from ROI pooling step. Once a feature map of an expected size is obtained, classification and border regression may be performed by a detection network such as R-CNN. For example, a k×k feature map may be expanded to a one-dimensional vector and then regressed through fully connected layers. A first fully connected layer may have N+1 units, wherein N is the total number of classifications, with an additional unit for background classification. A second fully connected layer may have 4*N units, which correspond to x- and y-coordinates of the candidate box, height, and width. The predicted classification and candidate box may be compared against ground truth data relating to the same, and one or more loss function may be computed during training to refine the inferencing steps. For example, a first loss function may correspond to classification loss and relate to whether the model correctly predicts the classification of an object. A second loss function may be a location loss corresponding to differences in X-coordinate, Y-coordinate, Width, and Height values of the inferred bounding boxes as compared to ground truth.

In some cases, where there are overlapping candidate boxes for the same object, they may be scored and sorted so that the candidate box with the highest score is selected for a particular object. The classification or categorization of the object and the score may be encoded in association with the bounding box anchor point and dimensions.

Accordingly, object detection may be performed in accordance to techniques described in connection with FIG. 2 and stored in association with a video stream. For example, frames of a video stream or other digital content may be parsed to identify objects, and annotations may be generated depicting at each frame (or at more sparse intervals) a list of objects in the frame, their coordinates, and height/width of the patches associated with each object. This process may be performed once and then reused for several image-based similarity searches and/or user-based recommendations. The results generated by this object detection phase may be provided to support image-based similarity searches, for example, as depicted in FIG. 3.

Figure 3:
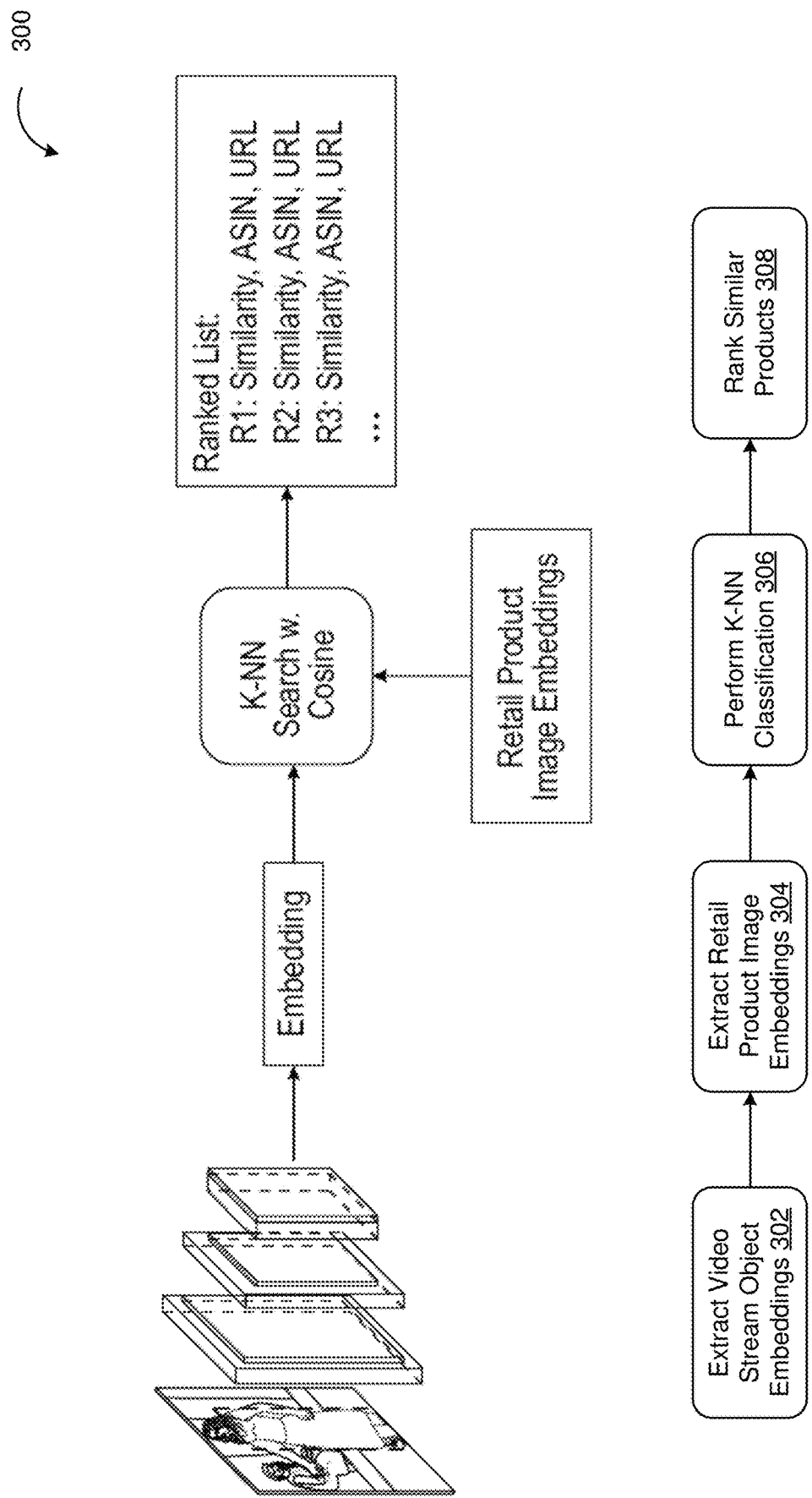
FIG. 3 depicts a diagram of a second phase for generating user-specific recommendations based on contextual information from a scene of a video stream, in accordance with one or more example embodiments of the disclosure.

FIG. 3 depicts a diagram 300 of a second phase for generating user-specific recommendations based on contextual information from a scene of a video stream, in accordance with one or more example embodiments of the disclosure. In various embodiments, workflow 302-308 may be used to perform image-based similarity searches to identify products of an online purchasing system that are similar to an object detected in a scene of a video stream or other digital content.

Techniques described in FIG. 3 may be performed in connection with object detection techniques described in connection with FIG. 2. For example, objects' classifications and bounding boxes at various frames of a video stream may be extracted in a first phase and stored in a database as annotations. The stored annotations may indicate patches of a frame that correspond to an object.

A system may extract video stream object embeddings 302. Embeddings may be used to capture semantic meaning along an embedding space. Features of an image may be mapped to a vector of real numbers where numbers that are closer together correspond to similar features. Embeddings may be generated using a convolutional neural network such as ResNet-50, ResNet-101, ResNet-152, and so forth. Other types of convolutions neural networks such as ResNeXt, DenseNet, and so forth may be used in place of or in combination with ResNet-based convolution a neural networks to determine embeddings for a patch of a video stream frame corresponding to an object.

Retail product image embeddings 304 may be extracted using techniques described in connection with step 302 described above. In some cases, embeddings are extracted from a whole product image rather than a portion of the product image. In various embodiments, embeddings for images are generated asynchronously from the embeddings for a video stream. For example, embeddings described in steps 302 and 304 may be extracted as part of independent workflows, and their results may be used for classification, as described in step 306.

A system may perform K-NN classification 306 based on the video stream embeddings to determine how similar the object in the video stream is to various products in a product database of an online purchasing system. For example, products of an online purchasing system may be stored with images of the product. Embeddings may be extracted from the product images and compared against the embeddings of the video stream or patch thereof. The comparison may be performed using machine-learning, for example, a K-NN classification model. In various embodiments, embeddings for a video stream object are compared against embeddings of a product as one-dimensional vectors that are compared based on their inner product space. The similarity score may be scaled from 0 to 1, with 0 indicating a high degree of dissimilarity and 1 indicating a very high similarity between the images being compared. In some cases, the similarity score is a value between 0 and a maximum value such as 100.

A system may rank similar products 308 based on visual similarity. Rankings may be performed by sorting a list of products that were compared against the video stream based on cosine similarity or cosine distance. For example, retail product images with the higher cosine similarities or lower cosine distance may be ranked higher than those that have respectively lower cosine similarities or higher cosine distance. A ranked list of similar products may comprise a similarity score, an identifier such as an ASIN of the product, a URL of the product page, and so forth. In various embodiments, the ranked list includes or is usable to determine various information about the similar product, such as a product name, short description, long description, product category, reviews, images of the product, and so forth.

A ranked list of products may be stored in association of the particular scene or patch of a scene that was parsed and used to generate the video stream embeddings determined in step 302. In various embodiments, the ranked list is re-generated periodically, so as to remain up-to-date based on changes to a product database, such as the release of new products, old products being discontinued, new images being available for products, and so forth. Ranked list of similar products may be generated on a periodic schedule, such as every week, month, or year.

Figure 4:
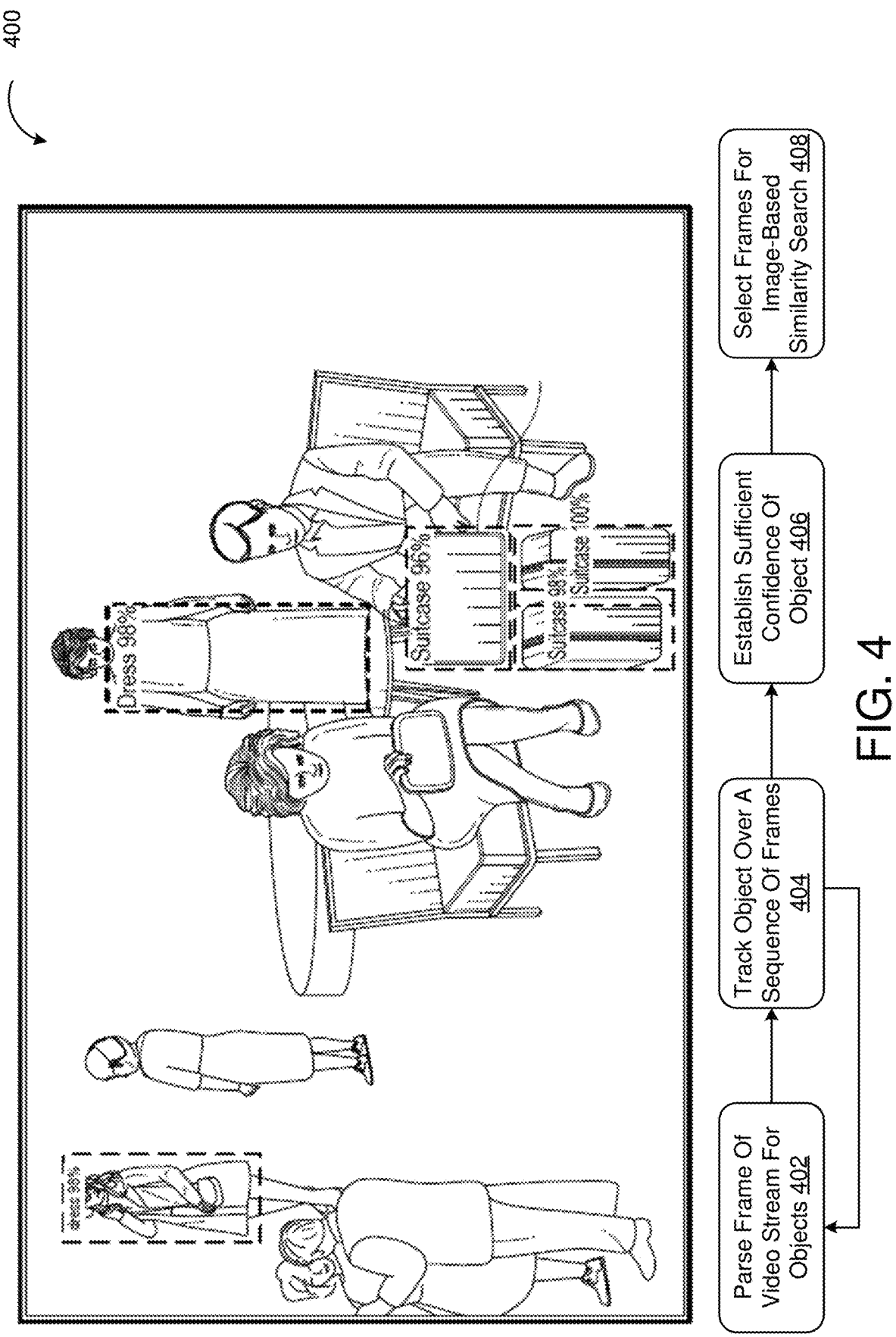
FIG. 4 depicts a use case in which a video stream may be continuously parsed, in accordance with one or more example embodiments of the disclosure.

For example, in accordance with example embodiments of the disclosure, cards that include content that is personalized to a user's taste/preferences may be presented to a user when the content is determined to be contextually relevant based on a current use context of a user device. It should be appreciated that the above examples of technical features and/or technical effects of example embodiments of the disclosure are merely illustrative and not exhaustive FIG. 4 depicts a use case 400 in which a video stream may be continuously parsed, in accordance with one or more example embodiments of the disclosure. FIG. 4 depicts an example scene of a video stream or other digital content where object detection techniques may be applied. In at least one embodiment, techniques to improve upon the accuracy of detected objects by performing continuous tracking are implemented herein.

At step 402, a system may parse a frame of a video stream for objects. An object detection model such as those described in connection with FIG. 1 and FIG. 2 may be utilized to perform object detection. Each object that is detected may be assigned an identifier that is used to track the object across multiple frames of a scene.

In various embodiments, an object is detected, assigned an identifier, and then tracked over a sequence of frames 404. Any suitable object tracking algorithm may be utilized to track an object across multiple frames. Objects moving in and out of frame or being occluded may cause object tracking of an object to end. In various embodiments, an object is tracked over a sequence of frames and an object detection model generates outputs for each frame of the sequence: a classification, a confidence value of the classification, an x-coordinate for an anchor, a y-coordinate for an anchor, a width, and a height. A computer vision or machine-learning mode for performing object detection may be configurable based on various parameters, such as a parameter that specifies the maximum number of objects to simultaneously detect at once.

Object detection metrics for a sequence of frames may be collected to establish sufficient confidence of an object 406. For example, an object may be detected and assigned a classification at an opening frame with low confidence which increases over time as the object becomes more visible, or other frames within the sequence may depict the object more clearly, without motion blurring, without occlusions, with better lighting, and so forth. Sufficient confidence of an object may be established by the object having a classification score that is higher than a threshold value for at least a threshold duration or threshold number of frames.

In various embodiments, a system may select frames from the tracked sequence for image-based similarity search 408. For example, key frames may be selected so that an image-based similarity search against a product database uses images of the same object from different perspectives or angles. Selected images may be the frames of a sequence that have the highest confidence scores or may be restricted to those that exceed a minimum confidence score.

FIG. 4 depicts a use case where various objects are tracked throughout a sequence of frames. For example, two dresses and three suitcases may be depicted in a scene across a sequence of frames. A first machine-learning model (e.g., Faster R-CNN) may be used to predict object bounding boxes and classifications. In at least one embodiment, once objects are tracked for a sufficient number of frames above a certain level of confidence (e.g., 90%+) the objects may be deemed to have been detected and identified with sufficient confidence so as to generate product recommendations. From the sequence of frames, one or more key frames for each object may be selected and stored in association with their bounding boxes, classifications, etc. and made available for downstream image-based product searches.

Figure 5:
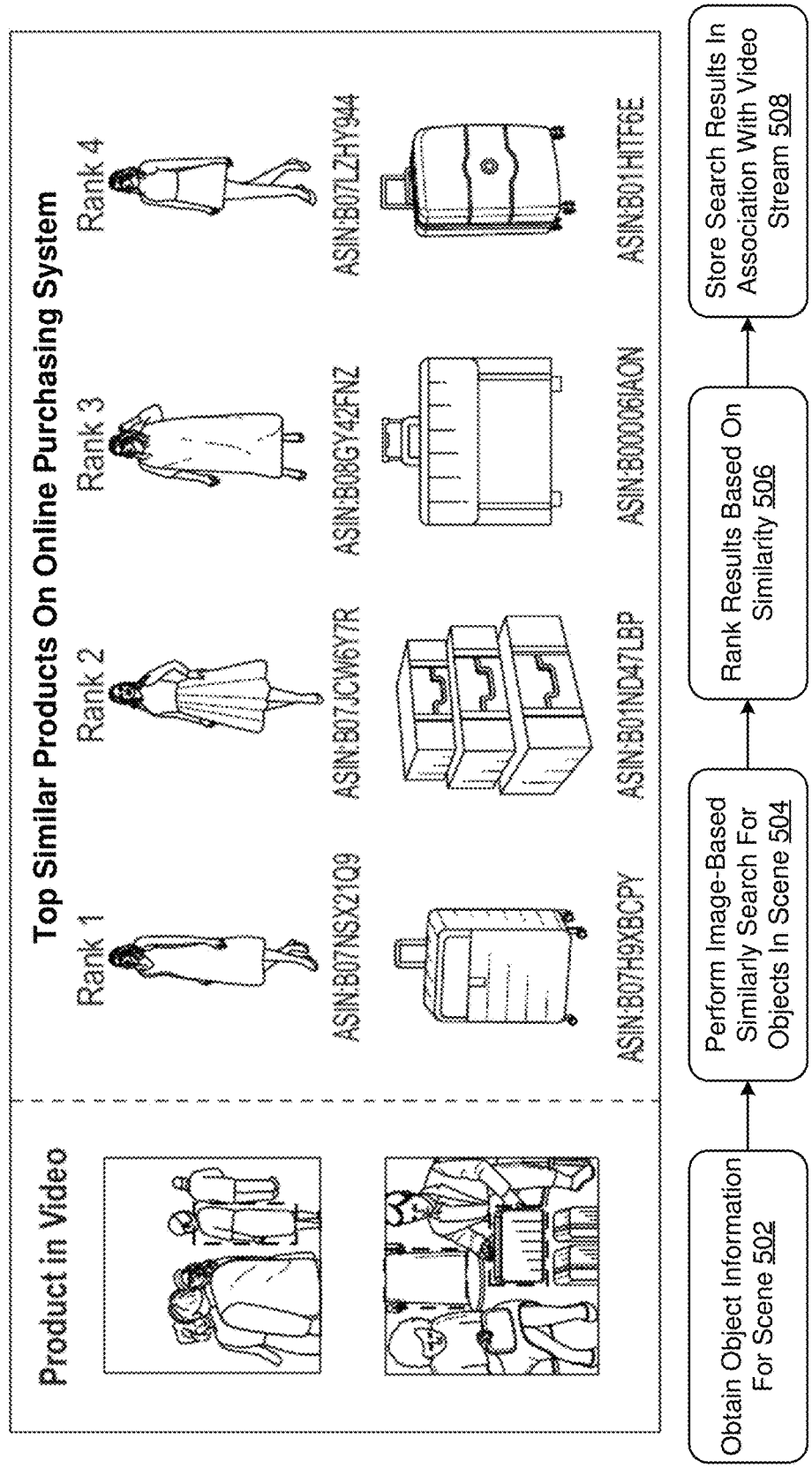
FIG. 5 depicts a use case in which image-based product searches are generated for a video stream or other digital content, in accordance with one or more example embodiments of the disclosure.

FIG. 5 depicts a use case 500 in which image-based product searches are generated for a video stream or other digital content, in accordance with one or more example embodiments of the disclosure. In various embodiments, a system (e.g., different from system used in FIG. 4) may be configured to generate ranked lists of similar products for a video stream or other digital content.

In at least one embodiment, annotations for a video stream are generated and stored in a database. Said annotations may include information regarding the location and placement of various objects that are depicted in the video stream. The annotations may be stored in a database separate from the underlying digital content such that the annotations may be viewed and utilized without reference to the corresponding digital content.

In various embodiments, image-based similarity search is performed to determine ranked lists of products available on an online purchasing system that are similar to objects depicted in a video stream or other digital content. At step 502, the system may obtain object information for a scene. The obtaining of object information may comprise referencing annotations that were generated for a scene that identify patches of an image where an object was detected. For example, and in reference to the frame depicted in FIG. 4, there may be annotations relating to a dress and luggage that were depicted in a scene.

At step 504, a system may perform an image-based similarity search for objects in the scene. The scene may include one object, multiple objects, etc. In various embodiments, object tracking is used wherein objects in a scene are assigned unique identifiers, and image-based similarity searches are performed for each identifier found in a database of annotations.

An image-based similarity search may be performed by comparing patches of a video stream that correspond to objects against images of products of an online purchasing system. The similarity or difference between objects may be determined using a second machine-learning algorithm such as a K-NN classification model that uses a ResNet-50 network to generate embeddings from images to be compared.

As a result of performing an image-based similarity search, similar products to an image may be identified, and at step 506, a system may rank results based on similarity. The search results may be ordered (e.g., ranked) in descending order, with the most similar item appearing as the result with the highest ordinal. In some cases, multiple searches are performed on a detected object over a sequence of frames to obtain multiple result lists, which are aggregated to provide for more stable and accurate search results. For example, if an object is detected and tracked over 750 frames of a video segment (e.g., approximately thirty seconds), various embodiments may select two tracked frames (e.g., those that are most clear, subject to the least motion or blurring, etc.) of the object from two different angles and submit patches from those frames for image-based similarity searches. Performing searches at different angles or perspectives may yield better search results. Search results for the object from the first angle may be returned (e.g., first list of the 50 most similar items from the first angle) and results from the second angle may be returned (e.g., second list of the 50 most similar items from the second angle). Each result entry may have a product identifier and a similarity score. The two lists may be aggregated—for example, if an item appears in both results, the aggregated score may be the sum or average of the individual similarity scores. The aggregated results may be tabulated to determine a final list of similar items. The video stream may be annotated with information regarding detected objects and/or similar items. For example, a video stream may be annotated with information indicating that a suitcase was visible from 25:30-25:40 of the video and a list of the most similar items to that suitcase found in the database of the online purchasing system.

At step 508, the system may store the ranked search result associated with the video stream. The ranked results may be stored in association or as part of annotations relating to the detected objects of a video stream. In various embodiments, the ranked list of products may be stored in association of the particular scene or patch of a scene. In various embodiments, the ranked list is re-generated periodically, so as to remain up-to-date based on changes to a product database, such as the release of new products, old products being discontinued, new images being available for products, and so forth. Ranked list of similar products may be generated on a periodic schedule, such as every week, month, year, and so forth. A ranked list of similar products may comprise a similarity score, an identifier such as an ASIN of the product, a URL of the product page, and so forth. In various embodiments, the ranked list includes or is usable to determine various information about the similar product, such as a product name, short description, long description, product category, reviews, images of the product, and so forth.

Figure 6:
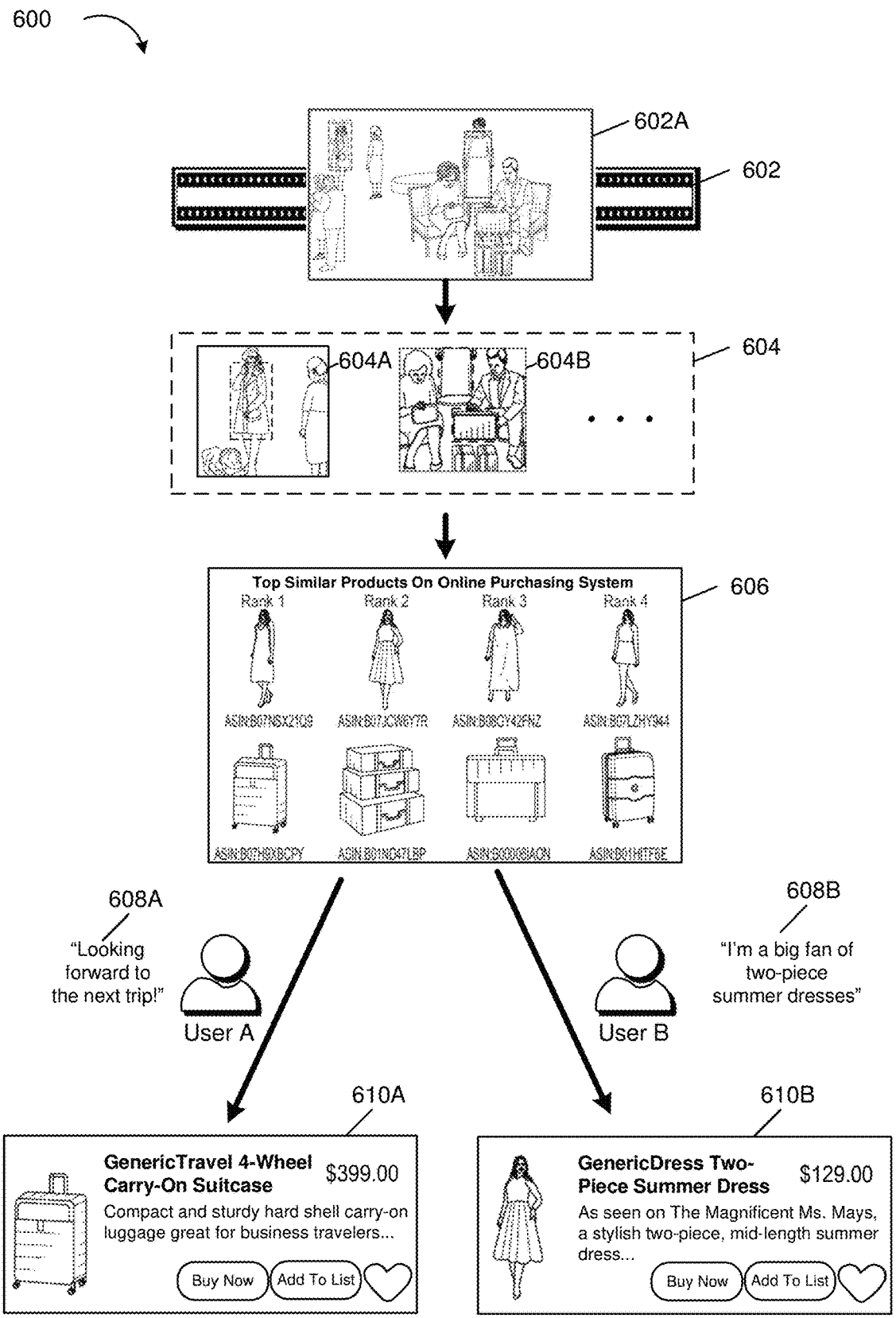
FIG. 6 illustrates an example use case for user-specific product recommendations that is depicted in accordance with one or more example embodiments of the disclosure.

Referring to FIG. 6, an example use case 600 for user-specific product recommendations is depicted in accordance with one or more example embodiments of the disclosure. In FIG. 6, it is depicted how, according to at least one embodiment, different recommendations may be generated based on customer contextual data indicating differing tastes/preferences.

A video stream 602 or other video content may be parsed for objects using a first machine-learning model. The first machine-learning model may be a convolutional neural network for object detection implemented using a convolution neural network such as Region based CNN, Fast-RCNN, Faster-RCNN, Faster-RCNN with FPN, and so forth. Video stream 602 may comprise frames 602A that may be treated as images for the purpose of performing object detection. In various embodiments, some or all frames of a video stream are parsed to detect objects. For example, every second, third, fourth, etc. frame may be parsed for object detection, so as to improve the efficiency of the overall process by reducing the number of frames that are parsed. Parsing every second frame may result in a 2× increase in computational efficiency; parsing every third frame may result in a 3× increase in computational efficiency; and so forth.

Frame 602A may be analyzed using first machine-learning model to identify one or more objects in the scene depicted in frame 602A. Object detection may comprise inferring, using a first machine-learning model, a classification and a bounding box location and size for each inferred object. A confidence score may be given to the object as to how confident the model is with regard to the inference. For example, frame 602A may be parsed using first machine-learning model (e.g., Faster-RCNN) to detect various objects, such as dresses and suitcases that are depicted in frame 602A. In various embodiments, patches of the frame 602A corresponding to the objects may be extracted. As an example, a first patch 604A corresponding to a first object (e.g., dress) may be extracted whereas a second patch 604B for a second object (e.g., suitcase) may also be extracted. Extracted objects 604 may be stored in a database and used for image-based similarity searches against a product database of an online purchasing system.

A second machine-learning model may be used to perform image-based similarity searches on the extracted objects 604 of video stream 602. For example, a video stream may be parsed as part of a first workflow where the entire video (or portions thereof) are parsed and annotated with object metadata. The annotations and/or metadata may be stored in a database for subsequent retrieval by a second workflow. The annotations may include patches of the object in an image-based format. A second workflow may obtain annotations, metadata, patches, etc. from the database and perform image-based similarity search on some or all objects of the database. For example, FIG. 6 depicts image-based similarity search being performed on the objects corresponding to 604A and 604B.

In various embodiments, a second machine-learning model is implemented to compare two images to determine a similarity score between the two images. A K nearest neighbor (K-NN) classification model may be used at least in part to implement the second machine-learning model. The second machine-learning model may compute cosine similarities between images, wherein the similarity score may be scaled from 0 to 1, with 0 indicating a high degree of dissimilarity and 1 indicating a very high similarity between the images being compared. In some cases, the similarity score is a value between 0 and a maximum value such as 100.

An image-based similarity search may be performed by obtaining a patch such as 604A or 604B and extracting a first one-dimensional embedding vector that encodes semantic meaning of the patch. A similar process may be performed on a product image from a product database to generate a second embedding vector. The two embedding vectors may be compared to determine a cosine similarity or cosine distance indicating how similar or dissimilar the object from the scene is to the product. This process may be repeated for several images in the product database to find similar products in a product database. For example, as seen in the image-based search results 606 of FIG. 6, search results for patch 604A may yield various dresses of similar style and shape, and likewise search results for patch 604B may yield various similar suitcase.

The search results may be ordered (e.g., ranked) in descending order, with the most similar item appearing as the result with the highest ordinal. In some cases, multiple searches are performed on a detected object over a sequence of frames to obtain multiple result lists, which are aggregated to provide for more stable and accurate search results. For example, if an object is detected and tracked over 750 frames of a video segment (e.g., approximately thirty seconds), various embodiments may select two tracked frames (e.g., those that are most clear, subject to the least motion or blurring, etc.) of the object from two different angles and submit patches from those frames for image-based similarity searches. Performing searches at different angles or perspectives may yield better search results. Search results for the object from the first angle may be returned (e.g., first list of the 50 most similar items from the first angle) and results from the second angle may be returned (e.g., second list of the 50 most similar items from the second angle). Each result entry may have a product identifier and a similarity score. The two lists may be aggregated—for example, if an item appears in both results, the aggregated score may be the sum or average of the individual similarity scores. The aggregated results may be tabulated to determine a final list of similar items. The video stream may be annotated with information regarding detected objects and/or similar items. For example, a video stream may be annotated with information indicating that a suitcase was visible from 25:30-25:40 of the video and a list of the most similar items to that suitcase found in the database of the online purchasing system. The annotations may be stored in a database table, structured storage, or any suitable manner of storage.

Product recommendations may be generated based on the image-based search results 606 and user-specific preference data. A third machine-learning model may be used to analyze customer contextual data to determine users' affinity scores for various products, such as products included in the search results 606.

As an illustrative example, consider two users, User A and User B depicted in FIG. 6—User A may have associated customer contextual data 608A from a comment, review, post, etc. that indicates that the user is "Looking forward to the next trip!" Textual data generated by users may be parsed by one or more NLP engines to determine how the textual data may negatively or positively affect User A's affinity score towards various products, such as dresses and suitcases in the search results 606. Embeddings may be generated for the textual data and used as an input to a third machine-learning model that determines affinity scores for the user with respect to various products. In this case, "Looking forward to the next trip!" may be indicative of User A having a preference towards traveling and travel-related products, and may increase User A's affinity score for suitcases, and so forth. Accordingly, among objects 604 depicted in frame 602A, the user may have the greatest affinity towards a suitcase-related product rather than other products depicted in frame 602A. In various embodiments, the product with the highest affinity score is selected for a user and displayed as a product recommendation. For example, User A may be shown an overlay 610A with a product recommendation for a suitcase-related product based on User A having a maximum affinity score for a suitcase product rather than other products shown in frame 602A.

In various embodiments, different product recommendations are shown based on different user preferences/tastes. For example, User B may have customer contextual data 608B such as a comment, review, post, etc. that indicates "I'm a big fan of two-piece summer dresses." This textual data may be analyzed with a NLP engine and used to generate embeddings that a third machine-learning model uses to determine that the user has a greater affinity score towards certain types of dresses. For example, because the user has expressed a preference or taste towards two piece dresses, the affinity score of two pieces dresses, such as those shown in Rank 2 and Rank 4 in search results 606 may be increased more than those for respective one piece dresses shown in Rank 1 and 3. Accordingly, even though the dress shown in Rank 2 is less similar than the dress shown in Rank 1, User B's customer contextual data may indicate that the less similar dress (e.g., Rank 2) should be selected as the product recommendation rather than the more similar dress (e.g., Rank 1). Accordingly, User B may have a second overlay 610B generated with different product recommendation from the first overlay 610A generated for User A based on differences in customer contextual data 608A and 608B between the two users.

Third machine-learning model may be implemented as a neural network or other suitable machine-learning model that analyzes customer contextual data such as reviews and determine that the user has written reviews on various iced tea products and has expressed a distaste for iced tea. A user's affinity score for various products identified in search results 606 may be increased or decreased based on such customer contextual data. In this way, and as an illustrative example, a highly similar product to an object detected on screen may be downgraded such that it is not shown as an overlay even though it has a higher similarity score than other products.

User-specific affinity scores may be generated in response to users performing various computer-based actions to interact with a video stream. For example, a user may pause the video stream using a remote control device, issue a voice-based command to control a display device integrated into a television set, and more. Affinity scores may refer to values that are determined as the likelihood or propensity of a user to perform a specific action, such as making a purchase, interacting with a graphical object, and more. Affinity scores may be generated for a user to identify a set of product recommendations to present. Several objects may be detected in a scene, and recommendations may be personalized to a user's taste/preferences. For example, if a scene includes various objects such as luggage suitcases and dresses, a first user that expresses a taste or preference for travel may be shown recommendations for suitcases similar to what was shown in the video stream. Conversely, a second user that expresses interest in fashion and has purchase and/or viewing history for dresses may be presented with recommendations for dresses similar to what was shown in the video stream.

One or more NLP engines may be used to parse the user's reviews to determine whether a user's affinity score should be increased or reduced based on the information provided by the user. NLP engines may be trained using a Bidirectional Encoder Representations from Transformers (BERT) model for pre-trained language representations to create models for the tasks of Natural Language Processing and extract high-quality language functionality from text-based data.

Overlays 610A and 610B may include product recommendation with various graphical and text-based information, such as a picture of the product, product name, short description, long description, price, and various computer-based actions that the user may take. Computer-based actions may include options to Favorite or Like the item, save the item to a shopping cart or wish list, purchase the item, learn more about the item, and so forth. In some embodiments, the product recommendations may be generated based on customer contextual data (e.g., customer contextual data 608A or 608B). For example, if User B has pressed a Like button or otherwise provided information indicating a positive association with the series "The Magnificent Ms. Mays" being shown in video stream 602 a character thereof, the style and fashion of the dresses in the show, the style and fashion of the time period of the show, etc., the description for the product may be personalized specifically to the user. For example, User B may be shown an overlay 610B with a short description specifically referencing the show that User B has expressed favor towards—"As seen on The Magnificent Ms. Mays, a stylist two-piece, mid-length summer dress . . . ." In various embodiments, customer-specific product recommendations may be determined by a machine-learning model and may be generated by said machine-learning model based on textual descriptions of the product that said machine-learning predicts will increase the user's affinity score with respect to the product. For example, such information regarding User A's preferences towards the show may be unavailable, and overlay 610A may include a generic description that does not reference the specific show being seen-"Compact and sturdy hard shell carry-on luggage great for business travelers . . . " Overlays 610A and 610B may include user-interactable object to perform various computer-based actions such as click-through, like, add to cart, buy now, etc. Computer-interactable actions included in the overlay may be selected based on the user's affinity to perform such actions.

Example embodiments described herein provide certain systems, methods, and devices for scene understanding and product recommendation. A visual image, such as a frame of a video, may be parsed to understanding the scene depicted in the image. A first machine-learning (ML) model may be used to detect objects in the scene and extracted portions of the image that depict the detected object. A second ML model may be used to ingest the portion of the image depicting the object and perform a similarity search against a database of products. The similarity search may compare a search image against a database of product images to identify visually similar products. A list of products that are visually similar may be used to generate engagement scores that are determined based on image similarity, user data such as viewing history, comments, and other preferences that may have been expressed by the user. Products may be ranked by user-specific engagement scores and may be used to select one or more products recommendations to present to the user in a graphical user interface, such as an overlay that appears over a visual image, such as a frame of video.

In accordance with one or more example embodiments of the present disclosure, a multimedia service serves multimedia content, such as a video stream, to a user. The video stream may be encoded according to an AVC (Advanced Video Coding) video compression standard such as H.264. The video stream may be received by a user and presented visually to the user on a graphics display device, such as a monitor, touchscreen, television, etc.

A user may control playback of the multimedia content by playing, fast forwarding, rewinding, pausing, or other various playback commands. Playback commands may be issued by a user for any of a variety of reasons. For example, in some cases, a user may pause a video or rewind a video in order to have a better view of the content that was displayed over a video segment. This may be referred to as a segment of interest.

When a user pauses a video, various techniques described herein may be used to generate product recommendations based on scene analysis and image similar analysis. For example, when a user pauses a scene, the scene may be parsed to understand contextual information relating to the scene, including but not limited to detecting objects in the scene. Machine-learning techniques, such as convolutional neural network (CNN)-based models may be used to implement computer vision techniques for object detection. A scene may include several objects. For example, a movie scene depicting two actors in a diner may include several objects including but not limited to the actors; the actors' clothes; a table, lights, and other fixtures depicted in the scene; plates, utensils, and other tableware; food items, such as beverage bottles, condiments; and more. A machine-learning model may parse a scene to extract objects from the scene, determine which objects in a scene are most contextually relevant, perform one or more image-based product searches on the extracted objects, and determine contextually relevant product recommendations that may be presented visually to the user.

A graphical user interface may be used to present contextually relevant product recommendations for a user in response to a user action. The user action may refer to a user issuing a playback command, such as pausing a video, or a sequence of actions that indicates that a segment may be of interest, such as pausing a video, rewinding, and re-playing a particular clip. In some cases, the user action may be an audio command that the user issues via speech.

For example, a user may speak a wake word followed by a command, such as "Alexa, find a dress like the one that Marcy was wearing in this scene." The voice command may be parsed and used to generate product recommendations. For example, the ranking of product recommendations may be adjusted based on contextual information encoded in the utterance. If a user asks "Alexa, find a dress like the one that Marcy was wearing in this scene" then the rankings for dresses may be increased based on the utterance indicating that the user is interested in dresses.

The above descriptions are for purposes of illustration and are not meant to be limiting. Numerous other examples, configurations, processes, etc., may exist, some of which are described in greater detail below. Example embodiments will now be described with reference to the accompanying figures.

A computing environment may include a multimedia delivery platform that serves multimedia content to users. Multimedia content may be provided as one or more discrete blocks (e.g., real-time stream continuously buffers 2-seconds of broadcasting and provides the stream in 2-second segments to a transcoder). Multimedia content may be transmitted to users as a continuous stream of short multimedia segments (e.g., 2-second segments). A multimedia segment may include audiovisual media.

Multimedia segments may include video and/or audio information for at least part of some multimedia source content. A segment may include one or more frames that may be assembled to be playable as a video. Audio data may also be included as part of a segment and may be compressed audio, such as MP3 audio. A manifest may be associated with a multimedia segment and may be in accordance with various protocols and standards such as the HTTP Live Streaming (HLS) protocol. In some systems, a multimedia input source may be transcoded into multiple formats, encodings, resolutions, etc., which may allow for greater flexibility to downstream components to serve the most appropriate format of multimedia content.

A multimedia delivery platform may generate transcoded multimedia segments from a multimedia input source in various resolutions, aspect ratios, bitrates, etc. that may be suitable for different types of viewing devices and/or different streaming network conditions and deliver such segments to a downstream entity such as a content delivery network (CDN).

Figure 7:
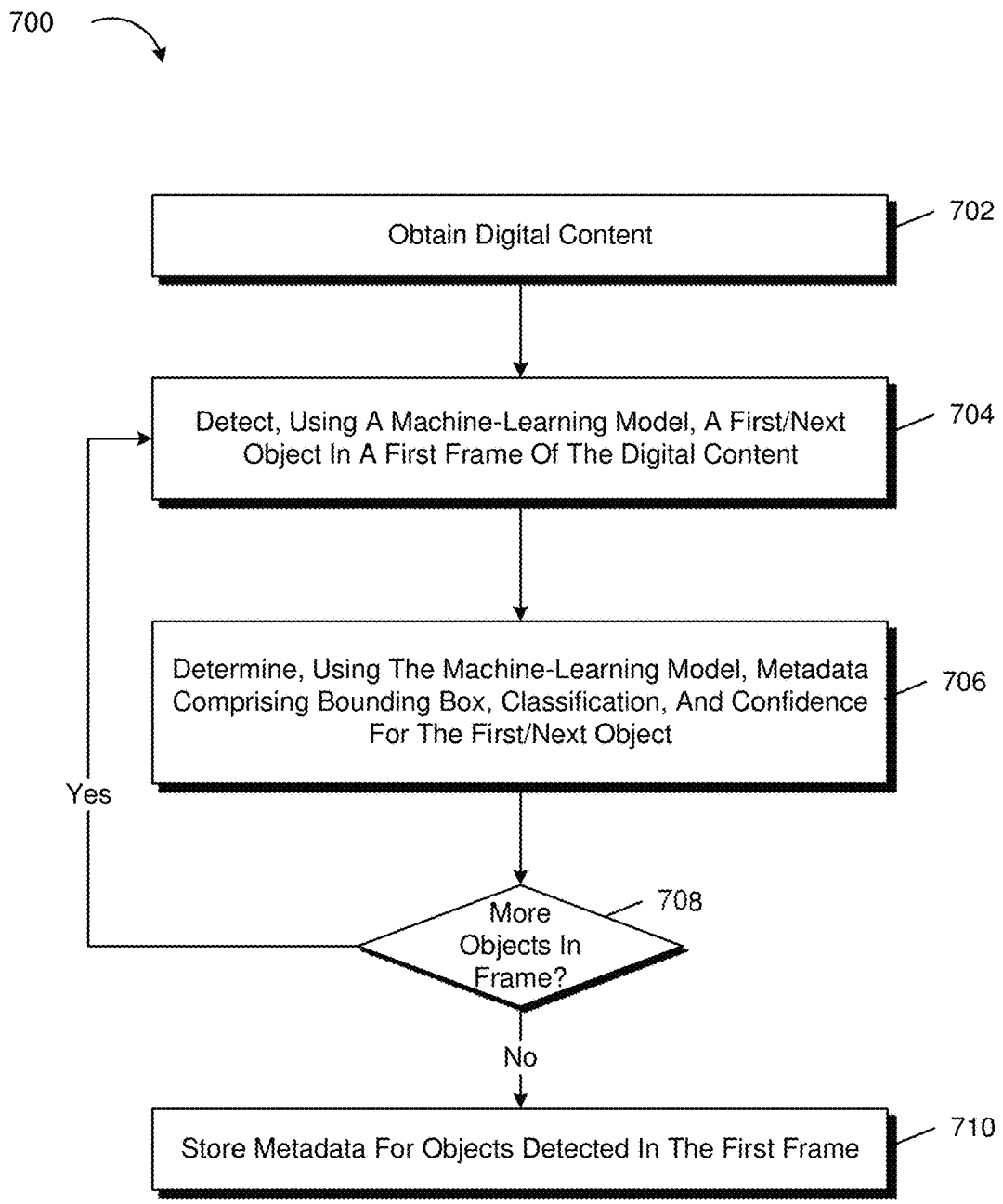
FIG. 7 shows an illustrative example of a process for parsing digital content for objects in a scene that may be used to perform image-based similarity searches, in accordance with one or more example embodiments of the present disclosure.

FIG. 7 shows an illustrative example of a process 700 for parsing digital content for objects in a scene that may be used to perform image-based similarity searches, in accordance with one or more example embodiments of the present disclosure. In at least one embodiment, some or all of the process 700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1 and 10. In at least one embodiment, process 700 or a portion thereof is implemented by a computing resource service provider or service thereof, such as a multimedia streaming service.

In at least one embodiment, process 700 comprises a step to obtain 702 digital content. Digital content may be in the form of a video stream or other suitable multimedia that may include video and/or audio components. Digital content may comprise a plurality of frames or images that may be played in succession on a display or playback device to provide a user with a video stream. Digital content may be selected in any suitable manner.

In at least one embodiment, digital content obtained in step 702 is parsed to detect objects. Frames of the digital content may be parsed one at a time or at various intervals that may be dependent on or independent of the contents being displayed. For example, keyframes or transition frames may be selected for performing object detection. In some embodiments, every second, third, fourth, etc. frame is analyzed for objects. Accordingly, frames may be selected in various manners and based on various criteria.

In at least one embodiment, process 700 comprises a step to detect 704, using a machine-learning model, a first object in a first frame of the digital content. The first frame may be selected in various manners and based on various criteria, as discussed above. The machine-learning model used to detect objects in a scene may be a convolutional neural network such as Region based CNN, Fast-RCNN, Faster-RCNN, Faster-RCNN with FPN, and more. The machine-learning model described in this step may be different in architecture from those depicted in FIG. 8 and FIG. 9.

In at least one embodiment, process 700 comprises a step to determine 706, using the machine-learning model, metadata comprising bounding box, classification, and confidence for the detected object. In at least one embodiment, the bounding box comprises x-coordinate and y-coordinate values for the bounding box and height and width information for the bounding box. As part of the object detection algorithm, metadata about the object may be determined, such as the x- and y-coordinates of the detected objects, the size of a bounding box that approximately represents a region or patch of the image that the object occupies. In some cases, object detection may also include coarse-grained information about what object was detected, such as a bicycle, a dress, a bottle, but not more granular information such whether the bike is a mountain bike or sports bike, whether the dress is a full-length dress or mini-skirt, the brand of a beverage bottle, etc. A convolutional neural network for object detection may be implemented using a convolution neural network such as Region based CNN, Fast-RCNN, Faster-RCNN, Faster-RCNN with FPN, and more.

In at least one embodiment, process 700 comprises a step to determine whether 708 more objects are in frame. If more objects are detected, then steps 704-706 may be repeated for each object. For example, a second bounding box, second classification, and second confidence may be determined for a second object that is detected in the frame image. Confidence scores may be generated for each object classification, indicating the statistical likelihood or confidence that the machine-learning model has in the classification of the object. For example, the classification may be from 0% to 100%.

In various embodiments, a computer-vision or machine-learning model is used to parse a scene for objects. Parsing a scene for objects may involve the performance of object detect, object identification, object tracking, and so forth. Combinations of techniques may be used—for example, an object may be detected at a first frame and tracked over a sequence of frames. From the sequence of frames tracking the same object, one or more key frames may be selected to perform image-based similarity search. The selection of these key frames may be based on various factors, such as whether the object is occluded, whether the object is in motion or subject to blurring, lighting effects, and more. In some cases, an object is shown from different angles or perspectives over a sequence of frames, and key frames may be selected from multiple angles to provide for more accurate search results. Objects may be parsed from a scene asynchronously from a user viewing a video stream. For example, a video stream may be analyzed for objects as part of a background process or workflow that is independent of user viewing of digital content.

If no more objects are detected in a scene, then process 700 may proceed to a step to store 710 metadata for objects detected in the first frame. For example, metadata for objects may be stored in association with a frame number or timestamp that may be used to query or otherwise determine which objects were visible in a frame. Objects may be assigned identifiers and tracked over multiple frames so that it may also be possible to determine that the same object was visible through a sequence of frames. A sequence of frames may be a continuous or non-contiguous sequence of frames.

In at least one embodiment, process 700 represents a discrete workflow that can be performed separately from other workflows, such as those described in connection with FIG. 8 and FIG. 9. For example, Process 700 may be performed when new digital content becomes available, whereas a process according to FIG. 8 may be performed periodically based on changes to a product database of an online purchasing system, and a process according to FIG. 9 may be performed in response to the user viewing and pausing the video stream at a particular frame.

Figure 8:
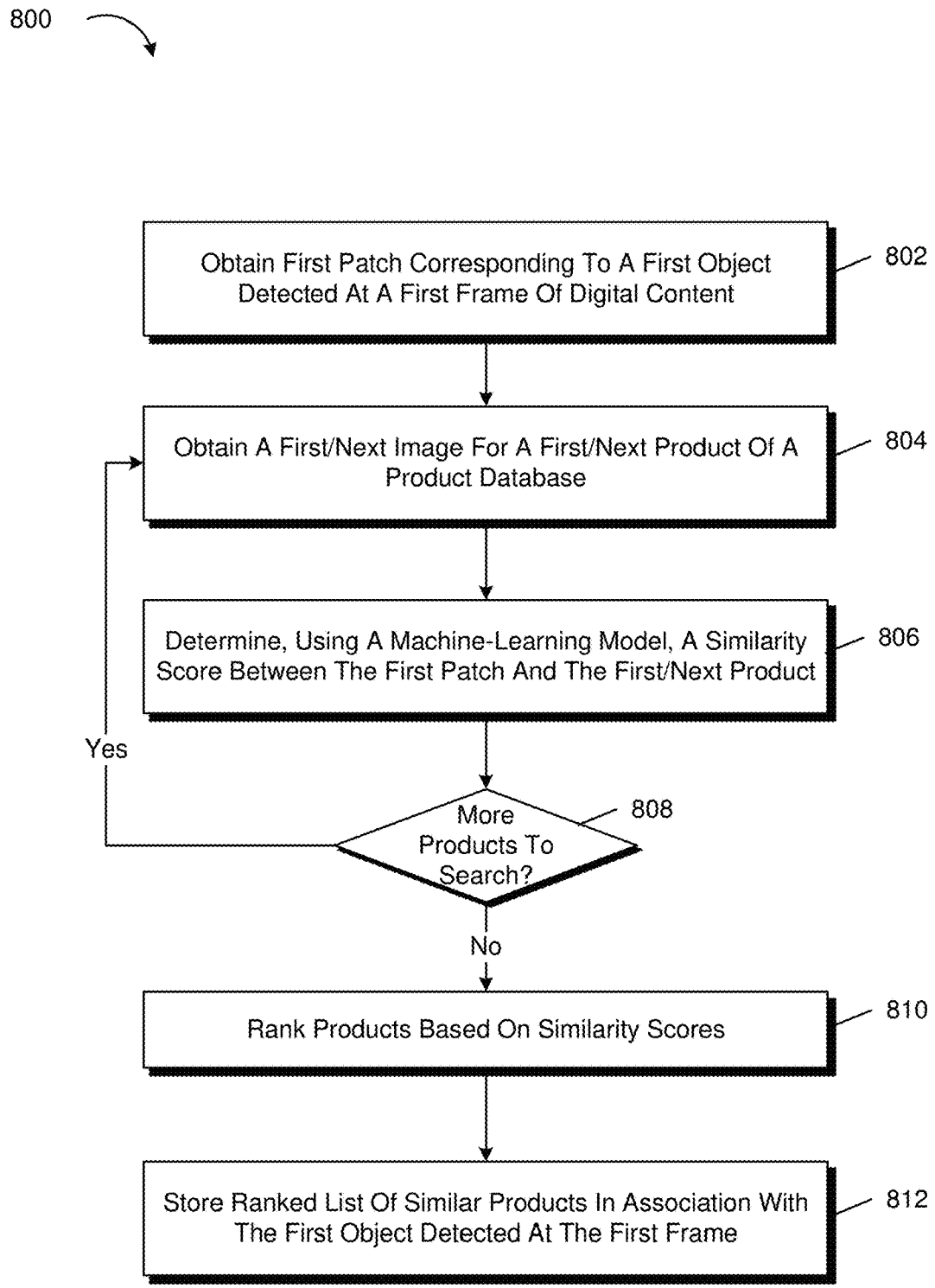
FIG. 8 shows an illustrative example of a process for performing image-based similarity searches in connection with product recommendations, in accordance with one or more example embodiments of the present disclosure.

FIG. 8 shows an illustrative example of a process 800 for performing image-based similarity searches in connection with product recommendations, in accordance with one or more example embodiments of the present disclosure. In at least one embodiment, some or all of the process 800 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 800 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 800 may be implemented in the context of various systems and methods described elsewhere in this disclosure, such as those discussed in connection with FIGS. 1 and 10. In at least one embodiment, process 800 or a portion thereof is implemented by a computing resource service provider or service thereof, such as a multimedia streaming service.

In at least one embodiment, process 800 comprises a step to obtain 802 first patch corresponding to a first object detected at a first frame of digital content. A patch may be a portion of a frame image that corresponds to a bounding box that was identified for an object. The patch may be determined using techniques described in connection with FIG. 7. The obtaining of the patch information may involve the retrieval of the results of performing techniques in accordance with FIG. 7 that were stored in a database for later retrieval.

In at least one embodiment, process 800 comprises a step to obtain 804 an image for a product of a product database. The product database may store information regarding products or items of an online purchasing system. A product may have multiple images from various angles, close-ups, etc.

In at least one embodiment, process 800 comprises a step to determine 806, using a machine-learning model, a similarity score between the first patch and the first product. An image-based similarity search may be performed using a K-NN classification model with cosine similarity, or other suitable neural networks. An example backbone network is ResNet-50, although other neural networks may also be used. The neural network may be pretrained from a database of images, such as the ImageNet database. The similarity metric may be cosine distance or cosine similarity, and K-NN may be the search model. Machine-learning models may be trained using linear regression, logistic regression, Ridge regression, Lasso regression, elastic net (EN) regression, support vector machine (SVM), gradient boosted machine (GBM), K nearest neighbors (K-NN), generalized linear model (GLM), and combinations thereof.

In at least one embodiment, process 800 comprises a step to determine whether 808 more products to search in the product database. For example, an online purchasing system may sell many types of dresses and some or all of the dress products may be compared for visual similarity against a dress represented in a patch. Once there are no more products to search, process 800 may proceed to a step to rank 810 products based on similarity scores. In at least one embodiment, a fixed number of similar products (e.g., ten most similar products) are retained. In some cases, only products over a certain similarity score are retained, and products that are too dissimilar are discarded. A ranked list of similar products may comprise a similarity score, an identifier such as an ASIN of the product, a URL of the product page, and so forth. In various embodiments, the ranked list includes or is usable to determine various information about the similar product, such as a product name, short description, long description, product category, reviews, images of the product, and so forth.

In at least one embodiment, process 800 comprises a step to store 812 ranked list of similar products in association with the first object detected at the first frame. The ranked list may be stored as metadata associated with an object in a frame of a video stream or over a sequence of frames of a video stream. For example, if an object is visible for a 10-second segment of digital content, a ranked list of similar products may be associated with the entire segment over which the object is visible.

In at least one embodiment, process 800 represents a discrete workflow that can be performed separately from other workflows, such as those described in connection with FIG. 7 and FIG. 9. For example, a process according to FIG. 7 may be performed when new digital content becomes available, whereas process 800 may be performed periodically based on changes to a product database of an online purchasing system, and a process according to FIG. 9 may be performed in response to the user viewing and pausing the video stream at a particular frame.

Figure 9:
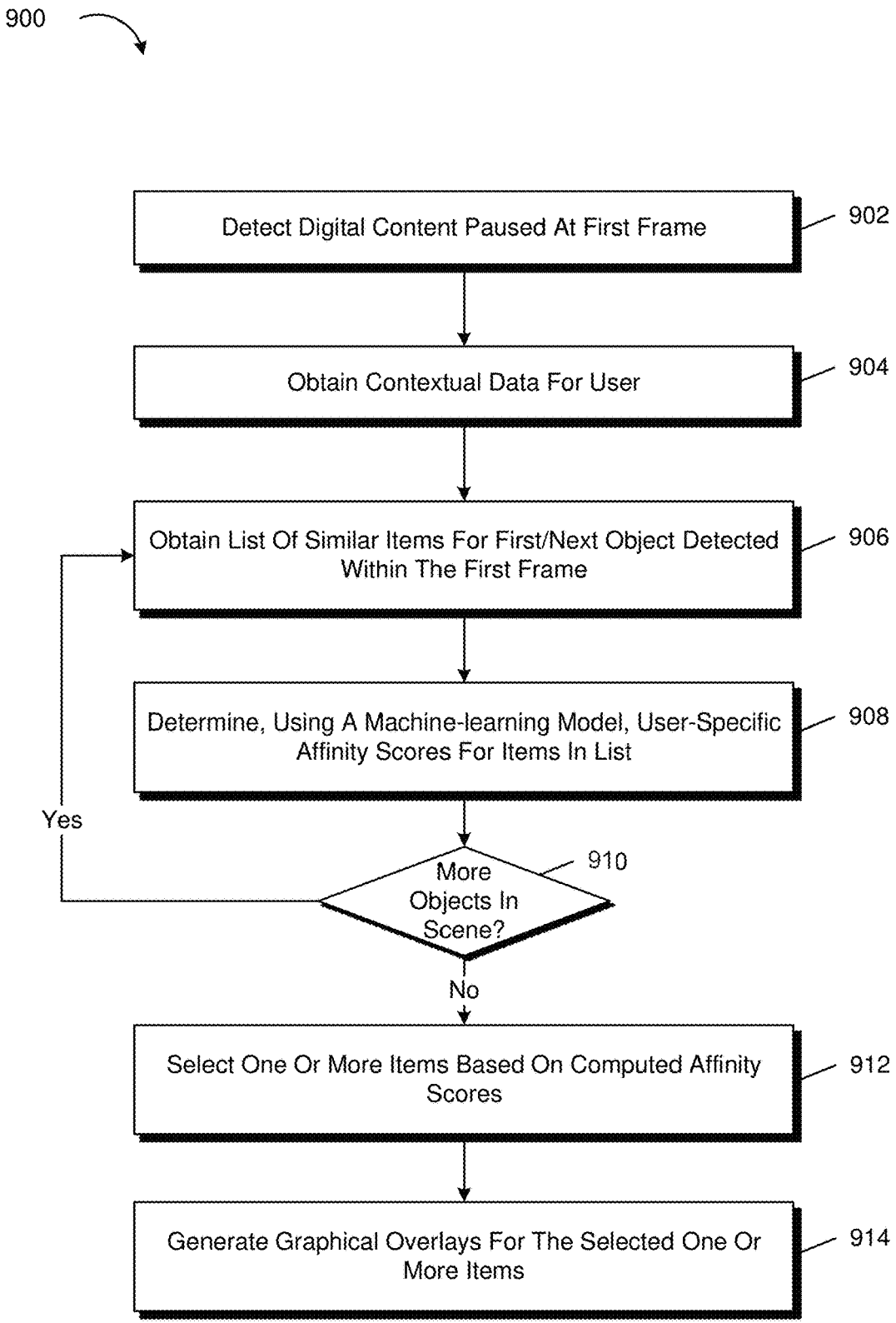
FIG. 9 shows an illustrative example of a process for generating contextually relevant user-specific product recommendations based on scene information, in accordance with one or more example embodiments of the present disclosure.

FIG. 9 shows an illustrative example of a process 900 for generating contextually relevant user-specific product recommendations based on scene information, in accordance with one or more example embodiments of the present disclosure. In at least one embodiment, some or all of the process 900 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 900 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 900 may be implemented in the context of various systems and methods described elsewhere in this disclosure, such as those discussed in connection with FIGS. 1 and 10. In at least one embodiment, process 900 or a portion thereof is implemented by a computing resource service provider or service thereof, such as a multimedia streaming service.

In at least one embodiment, process 900 comprises a step to detect 902 digital content paused at a first frame. User-specific affinity scores may be generated in response to users performing various computer-based actions to interact with a video stream. For example, a user may pause the video stream using a remote control device, issue a voice-based command to control a display device integrated into a television set, and more. These are non-limiting examples of computer-based actions. Affinity scores may refer to values that are determined as the likelihood or propensity of a user to perform a specific action, such as making a purchase, interacting with a graphical object, and more. Affinity scores may be generated for a user to identify a set of product recommendations to present. Several objects may be detected in a scene, and recommendations may be personalized to a user's taste/preferences. For example, if a scene includes various objects such as luggage suitcases and dresses, a first user that expresses a taste or preference for travel may be shown recommendations for suitcases similar to what was shown in the video stream. Conversely, a second user that expresses interest in fashion and has purchase and/or viewing history for dresses may be presented with recommendations for dresses similar to what was shown in the video stream.

In at least one embodiment, process 900 comprises a step to obtain 904 contextual data for a user. The user may refer to the user logged in to a device or associated with the streaming of digital content. A user's tastes/preferences may be determined based on various information available to a system. Customer contextual data may include, for example, search/browsing history data indicating previous search or browsing activity of the user, purchase history data indicating previous items/services purchased by the user, content consumption data indicating previous content consumed on the user device or other device(s), reviews or other content created by the customer, and so forth. Customer contextual data may be used to refine product recommendations and tailor to match a user's preferences/tastes. For example, a user's budget or previous shopping history may be used to refine product recommendations. Continuing with this example, if a customer's previous shopping history and budget indicates that the customer prefers to spend no more than $200 on clothing, the list of dresses similar to a dress displayed in the scene of a video stream may be filtered. For example, the filter may remove ball gowns that are over $1,000 due to the large price difference and reduced likelihood that a user would interact with such items. Items that are too expensive, sold out, discontinued, etc. may be filtered out or have their affinity scores reduced based on a user's tastes/preferences. Items within a specific range of a customer's budget may be included. For example, for a given budget B, a multiplier N where N>1 (e.g., N=1.25) may be used to create a maximum price filter of B*N to present the customer with some items that exceed their budget, but may nevertheless be relevant or that the customer is likely to action on or engage with.

In at least one embodiment, process 900 comprises a step to obtain 906 a list of similar items for a first object detected within the paused frame. A list of similar items or products may be retrieved from a metadata database that was populated using techniques described in connection with FIG. 7 and/or FIG. 8. For example, the first frame may be parsed using a first machine-learning algorithm to determine bounding boxes, classifications, and confidences of various objects in a scene and a second machine-learning algorithm may be used to perform image-based similarity searches between the objects detected in the scene and product images of an online purchasing system. The results of the image-based similarity search may be ranked and stored in association with the first frame for retrieval during process 900.

In at least one embodiment, process 900 comprises a step to determine 908, using a machine-learning model, user-specific affinity scores for items in the list. The machine-learning model may be implemented as a neural network or other suitable machine-learning model that analyzes customer contextual data such as reviews and determine that the user has written reviews on various iced tea products and has expressed a distaste for iced tea. A user's affinity score for various products identified in search results may be increased or decreased based on such customer contextual data. In this way, and as an illustrative example, a highly similar product to an object detected on screen may be downgraded such that it is not shown as an overlay even though it has a higher similarity score than other products.

In at least one embodiment, process 900 comprises a step to determine whether 910 more objects were detected in the scene. For example, if a second object was detected in the first frame, then a second list of similar objects for the second object may be obtained and user-specific affinity scores may be generated for the second list of objects using the contextual data for the user to determine the likelihood the user will perform a computer-based action, such as click-through, like, add to cart, buy now, etc., a product based on the user's tastes/preferences.

In at least one embodiment, if no more objects were detected in the scene, then process 900 may proceed to a step to select 912 one or more items based on computed affinity scores. In some embodiments, a number of overlays to generate may be determined first. For example, if the overlay is being generated for a television set or large high-resolution monitor, then there may be more overlays to generate than for a low-resolution mobile device that has less display space to show overlays.

In some cases, the affinity scores are selected strictly based on score. For example, the computed affinity scores may be ordered and the first and second highest scores may be selected to be displayed in two overlays. In some cases, diversity between products may be desired. For example, if the top two products are dresses and the third is a handbag, then overlays may be generated for the top dress and the top handbag.

In at least one embodiment, process 900 comprises a step to generate 914 graphical overlays for the selected one or more items. In various embodiments, graphical overlays are a type of recommendation that may be generated. Popups, banners, text, or other types of recommendations are also contemplated in the scope of this disclosure. A system may generate one or more overlays with user-specific recommendations. An overlay region may be selected, computed, or otherwise determined. One or more overlays may be generated in the overlay region. The overlay region may include a plurality of overlays for products having equal size and shape. In some cases, overlays for products that have a higher affinity score or are being promoted may be larger in size or featured more prominently. In some cases, overlays may be a rotating display wherein a first product is shown, and then replaced with a second product after a period of time has elapsed, and so forth. Overlays may be generated for the similar products with the highest user-specific affinity scores. A recommendation may comprise a user-interactable object such as a button or icon to perform computer-based actions to like, add to cart, buy now, etc. a recommended product.

For example, a machine-learning model may determine customer-specific affinity scores for a list of similar products to object based on customer contextual data and select items based on the affinity scores. In some cases, items are sorted by affinity score and the items with the highest user-specific affinity score are displayed in the overlays. However, such need not be the case—in some embodiments, the affinity scores are given weights such that products with higher user-specific affinity scores are probabilistically shown more frequently than products with lower user-specific affinity scores. Such a probabilistic display model may provide users with greater discovery of various similar products, rather than always showing the same similar items.

In at least one embodiment, process 900 represents a discrete workflow that can be performed separately from other workflows, such as those described in connection with FIG. 7 and FIG. 9. For example, a process according to FIG. 7 may be performed when new digital content becomes available, whereas process 800 may be performed periodically based on changes to a product database of an online purchasing system, and a process according to FIG. 9 may be performed in response to the user viewing and pausing the video stream at a particular frame.

One or more operations of the methods, process flows, or use cases of FIGS. 1-9 may have been described above as being performed by a user device, or more specifically, by one or more program module(s), applications, or the like executing on a device. It should be appreciated, however, that any of the operations of the methods, process flows, or use cases of FIGS. 1-9 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-9 may be described in the context of the illustrative devices, it should be appreciated that such operations may be implemented in connection with numerous other device configurations.

The operations described and depicted in the illustrative methods, process flows, and use cases of FIGS. 1-9 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 10:
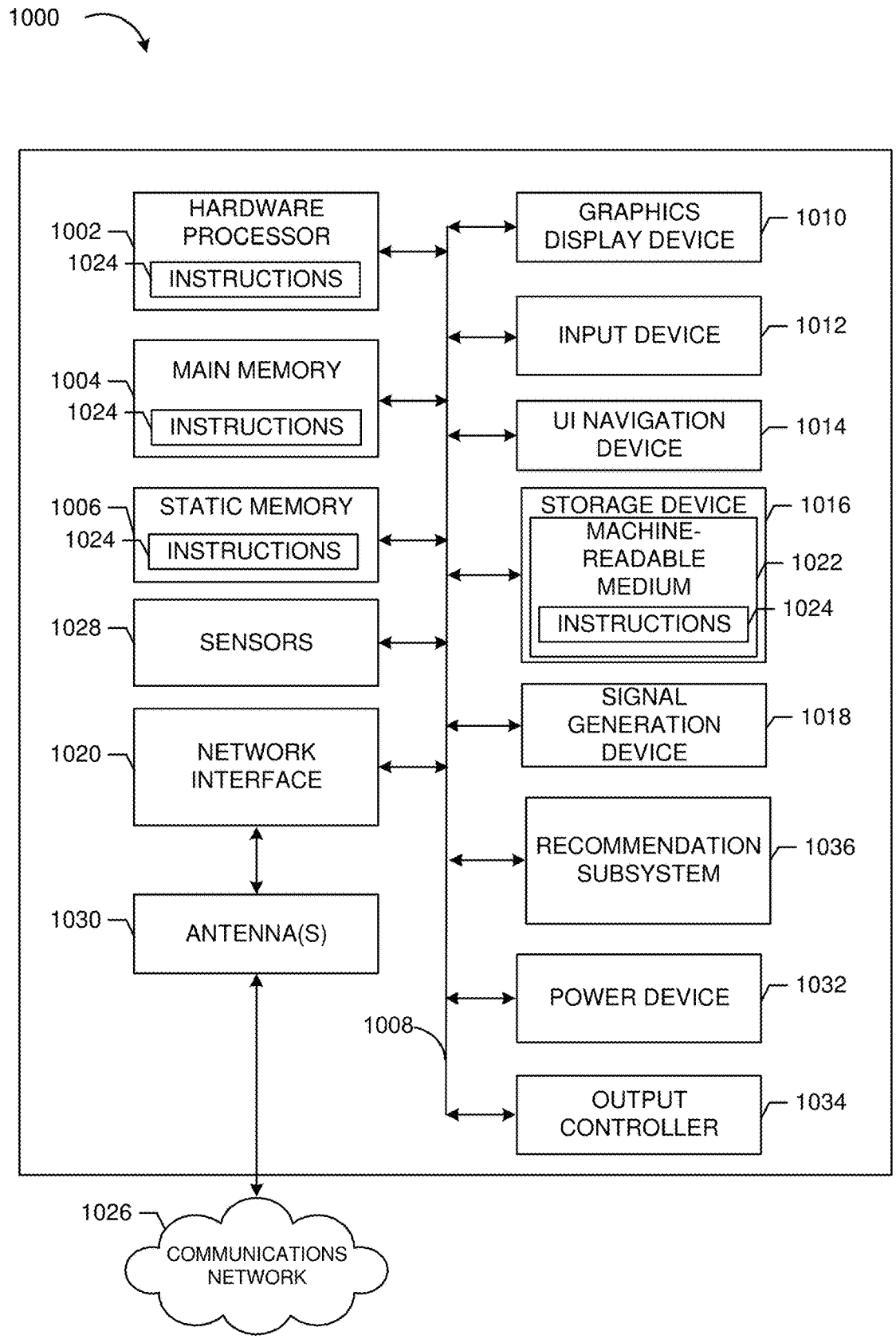
FIG. 10 illustrates a block diagram of an example machine upon which any of one or more techniques (e.g., methods) may be performed, in accordance with one or more example embodiments of the present disclosure.

FIG. 10 illustrates a block diagram of an example of a machine 1000 (e.g., implemented in whole or in part in the context of embodiments described in connection with other figures. In some embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in Wi-Fi direct, peer-to-peer (P2P) (or other distributed) network environments. The machine 1000 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1000 may include any combination of the illustrated components. For example, the machine 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a power management device 1032, a graphics display device 1010, an alphanumeric input device 1012 (e.g., a keyboard), and a user interface (UI) navigation device 1014 (e.g., a mouse). In an example, the graphics display device 1010, alphanumeric input device 1012, and UI navigation device 1014 may be a touch screen display. The machine 1000 may additionally include a storage device (e.g., drive unit) 1016, a signal generation device 1018, and a network interface device/transceiver 1020 coupled to antenna(s) 1030. The machine 1000 may include an output controller 1034, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

Recommendation subsystem 1036 may refer to software and/or hardware to implement various techniques described in this disclosure, including but not limited to processes and system described herein. For examples, processed in accordance with FIGS. 7-9 or portions thereof may be implemented using recommendation subsystem 1036.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random-access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device/transceiver 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1020 may include one or more physical jacks (e.g., Ethernet, coaxial, or phone jacks) or one or more antennas to connect to the communications network 1026. In an example, the network interface device/transceiver 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random-access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

What is claimed is:

1. A system, comprising:
one or more processors; and
memory storing executable instructions that, as a result of execution by the one or more processors, cause the system to:
parse a scene in a video content to identify a first object in multiple frames of the scene, the multiple frames including a first frame;
determine first information associated with the first object;
determine, using a second machine-learning model and based on the first information, similarity scores between the first object and one or more products of an online purchasing system, wherein the second machine-learning model is trained on a database of product images including images for the one or more products;
detect, in association with the first frame, performance of a first computer-based action by a user;
determine, based on contextual data of the user, one or more affinity scores for the user, wherein a first affinity score associated with a first product of the one or more products indicates a likelihood the user is to perform a second computer-based action in association with the first product;
select the first product based on the one or more affinity scores;
encode the video content to include an annotation associated with the first object, the annotation including third information associated with the first product; and
transmit the encoded video content to a user device.

2. The system of claim 1, wherein:
the first information comprises bounding box information for the first object; and
the instructions include further instructions that, as a result of execution by the one or more processors, further cause the system to:
extract a patch of the first frame corresponding to the bounding box; and
compute, using the second machine-learning model, cosine similarity scores between the patch and images of the one or more products.

3. The system of claim 1, wherein the instructions include further instructions that, as a result of execution by the one or more processors, further cause the system to:
determine second information associated with a second object within the first frame of video content.

4. The system of claim 3, wherein
determine, using the second machine-learning model, second similarity scores between the second object and a second one or more products of the online purchasing system;
wherein the one or more affinity scores comprises a second affinity score associated with a second product of the second one or more products; and the first product is selected further based on the first affinity score being greater than the second affinity score.

5. The system of claim 1, wherein:
the contextual data comprises text-based data; and
the instructions include further instructions that, as a result of execution by the one or more processors, further cause the system to use a natural language processing (NLP) engine to extract embeddings from the text-based data.

6. The system of claim 5, wherein the text-based data comprises a review, a comment, or a post by the user.

7. The system of claim 1, wherein
a first similarity score for the first object is determined, using the second machine-learning model, further based on a second frame of the video content, further wherein:
the first object is depicted in the first frame from a first perspective; and
the first object is depicted in the second frame from a second perspective different from the first perspective.

8. The system of claim 1, wherein the recommendation comprises a user-interactable object to perform the second computer-based action.

9. A non-transitory computer-readable storage medium storing executable instructions that, as a result of being executed by one or more processors of a computer system, cause the computer system to at least:
parse a scene in a video content to identify a first object in multiple frames of the scene, the multiple frames including a first frame;
determine first information associated with the first object within the first frame of video content;
determine, using a second machine-learning model and the first information, similarity scores between the first object and one or more products of an online purchasing system, wherein the second machine-learning model is trained on a database of product images including images for the one or more products;
detect, in association with the first frame of the video content, performance of a first computer-based action by a user;
determine, based on contextual data of the user, one or more affinity scores for the user, wherein a first affinity score associated with a first product of the one or more products indicates a likelihood the user is to perform a second computer-based action in association with the first product;
select the first product based on the one or more affinity scores;
encode the video content to include an annotation associated with the first object, the annotation including third information associated with the first product; and
transmit the encoded video content to a user device.

10. The non-transitory computer-readable storage medium of claim 9, wherein:
the first information comprises a classification of the first object and
the instructions, as a result of being executed by the one or more processors of the computer system, further cause the system to:
track the first object over a plurality of frames of the video content;
determine confidence of the classification of the first object exceeds a threshold over the plurality of frames; and
determine the similarity scores between the first object and the one or more products of the online purchasing system based on the confidence of the classification of the first object exceeding the threshold over the plurality of frames.

11. The non-transitory computer-readable storage medium of claim 9, wherein a similarity score between the first object and the first product is computed based on:
a first cosine similarity score determined based on:
a first portion of the first frame corresponding to the first object from a first perspective; and
a second image, of the first product; and
a second cosine similarity score determined based on:
a second portion of a third frame corresponding to the first object from a second perspective; and
a fourth image, of the first product.

12. The non-transitory computer-readable storage medium of claim 9, wherein the contextual data comprises a budget, shopping history, browsing history, wish list, or shopping cart of the user.

13. The non-transitory computer-readable storage medium of claim 9, wherein the performance of the first computer-based action by the user comprises a command to pause the video content at the first frame.

14. The non-transitory computer-readable storage medium of claim 9, wherein the contextual data comprises a product review written by the user.

15. The non-transitory computer-readable storage medium of claim 14, wherein the recommendation comprises a user-interactable object to perform the second computer-based action.

16. The non-transitory computer-readable storage medium of claim 15, wherein the recommendation further comprises a product description generated based on the product review or video content.

* * * * *